US005771117A

United States Patent [19]
Harris et al.

[11] Patent Number: 5,771,117
[45] Date of Patent: Jun. 23, 1998

[54] METHOD AND APPARATUS FOR NONLINEAR FREQUENCY GENERATION USING A STRONGLY-DRIVEN LOCAL OSCILLATOR

[75] Inventors: Stephen E. Harris, Palo Alto; Guang-Yu Yin, Mountain View; Maneesh Jain, Palo Alto, all of Calif.

[73] Assignee: The Board of Trustees of The Leland Stanford Junior University, Stanford, Calif.

[21] Appl. No.: 669,028

[22] Filed: Jun. 17, 1996

[51] Int. Cl.$^6$ ...................................... G02F 1/39
[52] U.S. Cl. .......................................... 359/326; 359/330
[58] Field of Search ..................... 372/3–5; 359/326–332

[56] References Cited

U.S. PATENT DOCUMENTS

| | | | |
|---|---|---|---|
| 3,764,807 | 10/1973 | Pollack | 359/326 X |
| 4,063,195 | 12/1977 | Abrams et al. | 359/330 |
| 4,243,881 | 1/1981 | Bethune et al. | 359/327 X |
| 4,504,949 | 3/1985 | White | 372/3 |
| 4,628,513 | 12/1986 | White | 372/3 |
| 4,829,597 | 5/1989 | Gelbwachs | 359/326 X |
| 5,095,212 | 3/1992 | Cook | 359/326 X |
| 5,110,204 | 5/1992 | Miles et al. | 359/327 X |

OTHER PUBLICATIONS

S.Babin, U. Hinze, E. Tiemann, B. Wellegehausen, Continuous resonant four–wave mixing in double–A level configurations of Na2, Optics Letters21(15), Aug. 1, 1996, pp. 1186–1188.

J. Donoghue, M. Cronin–Golomb, J.S.Kane, P.R. Hemmer, Self–Pumped Optical Phase Conjugation with a Sodium Raman Laser, Optics Letters 16(17),Sep. 1, 1991, pp. 1313–1315.

Primary Examiner—John D. Lee
Attorney, Agent, or Firm—Lumen Intellectual Property Services

[57] ABSTRACT

Efficient nonlinear processes in a nonlinear optical medium are achieved by combining the concept of electromagnetically induced transparency (EIT) and a strongly-driven atomic local oscillator. The present method uses a nonlinear optical medium having elementary entities, such as atoms or molecules, in which a ground state $|1\rangle$ and a second state $|2\rangle$ are selected such that the transition between the ground state $|1\rangle$ and the second state $|2\rangle$ is a dipole forbidden transition. An upper state $|3\rangle$ selected from among the energy states $|i\rangle$ above the ground state $|1\rangle$ such that a two-photon transition between the ground state $|1\rangle$ and the second state $|2\rangle$ via the upper state $|3\rangle$ is allowed. A strongly-driven coherent superposition state which gives rise to the strongly-driven local oscillator is produced by applying two pumping beams, P1 and P2, at frequencies corresponding to transitions between states $|2\rangle$ and $|3\rangle$ and between states $|1\rangle$ and $|3\rangle$. The nonlinear optical medium prepared in this way is used for efficient sum-and-difference and parametric generation in $\Lambda$ and ladder systems.

55 Claims, 9 Drawing Sheets

Λ SYSTEM

LADDER SYSTEM

Λ SYSTEM - SUM GENERATION

Λ SYSTEM - DIFFERENCE GENERATION

LADDER SYSTEM - SUM GENERATION

LADDER SYSTEM - DIFFERENCE GENERATION

Λ SYSTEM - PARAMETRIC GENERATION

LADDER SYSTEM - PARAMETRIC GENERATION

METHOD AND APPARATUS FOR NONLINEAR FREQUENCY GENERATION USING A STRONGLY-DRIVEN LOCAL OSCILLATOR

This invention was made with government support of the Office of Naval Research (ONR), Army Research Office (ARO) and Air Force Office of Scientific Research (AFOSR) under contracts N00014-91J-1023 and DAAH04-95-1-0039. The government has certain rights in this invention.

FIELD OF THE INVENTION

This invention relates to nonlinear frequency generation performed in nonlinear optical media, and in particular to nonlinear frequency generation in such nonlinear media using a strongly-driven local oscillator produced by a strongly-driven coherent superposition state.

BACKGROUND OF THE INVENTION

The field of optics is expanding at a rapid pace. In many diverse areas of technology solutions employing optical systems and methods have been developed. These solutions place high demands on the performance of optical devices and especially on units delivering light beams such as laser beams. The units generating these beams have to be adaptable and efficient. In other words, the wavelength of the beams as well as their intensity level should be adjustable, whenever possible, over a wide range.

At the present time laser sources are capable of generating light at a number of wavelengths. Some sources are also tunable over a bandwidth. Unfortunately, the output characteristics of all known sources vary greatly, depending on the lasing medium and other parameters, and not many are able to supply light beams of sufficient quality and at power levels required for technological applications. In addition, there are still gaps in the spectrum, meaning that many frequency ranges are inaccessible.

A few high-quality sources, such as the Nd:YAG laser, have established themselves as the most efficient devices for generating laser light. These sources are limited to a relatively small set of wavelengths. A number of nonlinear processes occurring in crystals, gases and liquids are being used to convert the light of such high-quality sources to other wavelengths. The most widely used processes include Raman scattering, optical parametric conversion and sum-and-difference generation. These processes are nonlinear and hence fall into the area of nonlinear optics.

The art of nonlinear optics has now been practiced for about thirty years. According to the techniques of this art, nonlinear media are used to generate light at one or more desired wavelengths. Sum-and-difference generation is the most fundamental of these processes.

In a basic arrangement for practicing this technique a nonlinear medium, e.g., a crystal, is arranged to be irradiated by two input beams. These two input beams have different frequencies $\omega_1$ and $\omega_2$. The inherent nonlinearity of the medium is expressed by the response of its elementary entities, e.g., atoms or molecules, to the two input beams. In particular, the two beams induce the elementary entities to oscillate at frequencies corresponding to $\omega_1+\omega_2$ and $\omega_1-\omega_2$, i.e., the sum and difference frequencies. This method is also applicable to more than two input beams to produce their sums and differences, as is well-known in the art.

Another method for generating a beam at a new frequency is called optical parametric generation. In accordance with this process a nonlinear medium is irradiated by a strong pumping beam at a pumping frequency $\omega_p$. The nonlinearity of the medium manifests in generating two beams at a signal frequency $\omega_s$ and an idler frequency $\omega_i$, such that these two frequencies sum to the pumping frequency ($\omega_p=\omega_s+\omega_i$). To stimulate a particular pair of frequencies, the nonlinear medium must be phase matched or almost phase matched at those frequencies. This is accomplished by controlling the refractive indices of the media, for example, by changing the temperature, the angle between the different beams, or, in anisotropic media, by using appropriate polarizations and directions of propagation. A particular pair of frequencies is amplified in an appropriate cavity.

In fact, most practical nonlinear devices make use of nonlinear crystals. Nonlinear converters equipped with such crystals are capable of generating light at wavelengths from 2,000 Å to about 5 $\mu$m and, in certain special cases, at longer wavelengths. For wavelengths shorter than about 2,000 Å the most common nonlinear media are metal vapors and gases. Wavelengths larger than 5 $\mu$m are also derived by mixing in metal vapors and gases, although, in general, such processes are very inefficient.

Conversion efficiency poses a major problem to nonlinear generation of light beams at new frequencies. In fact, to achieve high conversion ratios the distance over which the various light beams have to interact is relatively long. In other words, to obtain a high degree of conversion the beams involved in the nonlinear process have to travel through a long section of the nonlinear medium. In addition, while traveling the beams have to maintain a certain phase relationship, i.e., they need to be phase matched. In particular, the phase velocity of the driving polarization, i.e., the input beams, has to be equal to that of the wave which is generated, i.e., the output beam or beams. If one does not use special techniques to accomplish such phase matching, the effective length of the materials which may be used to perform the frequency conversion is very small, leading to poor conversion efficiencies. The physical distance over which the driving polarization and the generated wave or beam slip off each other is termed the coherence length, $L_c$.

Many attempts have been made to increase the coherence length $L_c$ in nonlinear processes. Prior art solutions to this problem are based on various phase matching techniques. There is a considerable amount of literature on this subject. Unfortunately, these techniques are very complicated, often impractical, especially in gaseous or liquid conversion media, and costly. In crystals some matching techniques are practical, but, as pointed out above, their output range is usually limited to wavelengths from 2,000 Å to about 5 $\mu$m and, in certain special cases, at longer wavelengths. Thus, the phase matching problem has become one of the major stumbling blocks to progress in nonlinear frequency conversion.

A process called electromagnetically induced transparency (EIT) has been known to render a medium which is optically opaque or refractively thick (a medium in which the phase delay relative to that in vacuum is at least several $\pi$) transparent or refractively thin by applying two frequencies to the medium. It has been found that when the two frequencies are applied in an appropriate manner, e.g., as described in *Electromagnetically Induced Transparency: Propagation Dynamics* by A. Kasapi et al. in Physical Review Letters, Mar. 27, 1995, Vol. 74, No. 13, pp. 2447–2450 and *Nonlinear Optical Processes Using Electromagnetically Induced Transparency* by S. E. Harris et al. in Physical Review Letters, Mar. 5, 1990, Vol. 64, No. 10, pp. 1107–1110, the material will become transparent to one or both of these frequencies. Furthermore, this process allows one to tune lasers close to optical resonances. Without this process, an attempt to approach an optical resonance often results in some combination of loss, phase delay and beam distortion for either one or both of the optical beams.

For about thirty years it has been known that nonlinear optical coefficients could be greatly increased by approaching resonances. Unfortunately, for reasons noted above, this approach was not realized. On-resonance methods have typically produced low conversion efficiencies, e.g., on the order of about $3.3 \times 10^{-5}$, for a two-photon process as described by Hodgson et al. in *Tunable Coherent VUV Generation in a Vapor*, Physical Review Letters, Vol. 32, p. 343, 1973. S. E. Harris et al. suggested in the above-cited article of March 1990 that EIT may be useful to allow efficient nonlinear optical processes, but the Harris work did not foresee how to make such a method operable and only suggested the use of one resonant transition. Further discussion on this approach can be found in the early work of Hakuta et al. Physical Review Letters, Vol. 66, p. 596, 1991 and in the article of G. Z. Zhang et al., Physical Review Letters, Vol. 71, p. 3099, 1993.

Thus, at the present time, there are still no efficient methods to practice nonlinear generation in nonlinear optical media such as gases or liquids, and processes involving crystals are limited to the above-mentioned wavelength domains.

OBJECTS AND ADVANTAGES OF THE INVENTION

In view of the above, it is an object of the invention to provide a method and apparatus for practicing efficient frequency generation and conversion throughout the electromagnetic spectrum. In particular, it is an object of the invention to increase the efficiency of nonlinear processes and to solve the phase matching problem.

It is another object of the invention to provide a method for suitably preparing a nonlinear medium, such as a gas, liquid, or solid to enhance nonlinear processes induced in that medium.

Another object of the invention is to provide a method and apparatus for practicing efficient sum generation, difference generation and parametric generation in nonlinear media.

Other objects and advantages of the present invention will be explained in the detailed description section.

SUMMARY OF THE INVENTION

This invention is based on the surprising finding that nonlinear processes in a nonlinear optical medium, such as a solid, liquid, or gas are enhanced to unprecedented efficiencies by electromagnetically induced transparency in which a two-photon transition is strongly-driven to establish a strongly-driven atomic local oscillator. In particular, the method and apparatus of the invention combines the concept of electromagnetically induced transparency with other concepts of nonlinear optics to allow efficient frequency conversion in material lengths on the order of a coherence length $L_c$ to thereby overcome the principal limitations of prior art.

The present method of nonlinear frequency generation uses a nonlinear optical medium having elementary entities, such as atoms or molecules, in which a ground state $|1\rangle$ and a second state $|2\rangle$ are selected such that the transition between the ground state $|1\rangle$ and the second state $|2\rangle$ is a dipole forbidden transition. Furthermore, the nonlinear medium has an upper state $|3\rangle$ selected from among the energy states $|i\rangle$ above the ground state $|1\rangle$ such that a two-photon transition between the ground state $|1\rangle$ and the second state $|2\rangle$ via the upper state $|3\rangle$ is allowed. It is understood that the method also works for several upper states at a time. The dipole forbidden transition is excited by means of virtual transitions through the upper states of the atom. When tuning close to a single upper state such as state $|3\rangle$, that state dominates this process. In general, however, all of the upper dipole allowed transitions of the elementary entity involved (e.g., atom) are in a virtual manner to allow, when appropriate frequencies are applied, the excitation of the two-photon transition.

The method calls for applying to the nonlinear medium a first pump beam P1 at a coupling frequency $\omega_c$ corresponding to a first transition between the second state $|2\rangle$ and the upper state $|3\rangle$. A second pump beam P2 at a probe frequency $\omega_p$ corresponding to a second transition between the ground state $|1\rangle$ and the upper state $|3\rangle$ is also applied to the nonlinear medium. It should be noted, that when the first pump beam P1 is sufficiently intense, it produces electromagnetically induced transparency of the nonlinear medium to the second pump beam P2 or both pump beams. The intensities of the first pump beam P1 and of the second pump beam P2 are then adjusted to produce a strongly-driven coherent superposition state of said ground state $|1\rangle$ and said second state $|2\rangle$. In effect, this strongly-driven coherent superposition state creates a local oscillator at a local oscillator frequency $\omega_{12}$ corresponding to the forbidden transition.

Once the local oscillator is obtained the nonlinear medium is ready for nonlinear frequency generation. In particular, for sum-and-difference generation an input beam is passed through the nonlinear medium to produce a generated beam having a generated frequency $\omega_g$. In parametric generation no additional input beam is required and the generated beams are extracted directly from the nonlinear medium.

The method of the invention can be practiced with different energy level configurations. For example, the upper state $|3\rangle$ can be selected such that its energy level is higher than the energy level of the second state $|2\rangle$. This produces the so-called $\Lambda$ system in the nonlinear medium. Selecting the upper state $|3\rangle$ to have an energy lower than the energy of the second state $|2\rangle$ creates a ladder system. Both systems are viable for practicing sum generation, difference generation and parametric generation.

To ensure the transparency effect, it is preferable to apply the first pump beam P1 before the second pump beam P2. This renders the nonlinear medium transparent or refractively thin to the second pump beam P2. In addition, the intensity of the second pump beam P2 should be eventually increased to be on the order of magnitude of the intensity of the first pump beam P1. Following this procedure causes the Rabi frequency $\Omega_c$ of the first pump beam P1 to be on the order of magnitude of the Rabi frequency $\Omega_p$ of the second pump beam P2.

There are many criteria for preparing a strongly-driven local oscillator. For one, the intensity of the second pump beam P2 should be equal to at least one tenth the intensity of the first pump beam P1. This condition allows one to prepare a strongly-driven local oscillator. According to another criterion, the number of photons $n_{P1}$ in the first pump beam P1 exceeds the oscillator strength weighted number of elementary entities $N_E$ in the path of the first pump beam P1 through the nonlinear medium such that $(f_{13}/f_{23})(N_E/n_{P1}) \ll 1$. According to yet another criterion, the intensity of the first pump beam P1 should be such that the a.c. Stark shift in the nonlinear medium due to the first pump beam P1 exceeds the inhomogeneous linewidth of the forbidden transition. Finally, the temporal pulse length of the second pump beam P2 should be shorter than or on the order of the dephasing/homogeneous lifetime of the forbidden transition.

When using the method of the invention for sum generation or difference generation an input beam is applied to the nonlinear medium. Thus, when the input beam has an input frequency $\omega_{in}$ and the generated beam is produced by sum generation with the local oscillator frequency $\omega_{12}$ the generated frequency $\omega_g$ is equal to said input frequency $\omega_{in}$ plus said local oscillator frequency $\omega_{12}$. On the other when the generated beam is produced by difference generation the generated frequency $\omega_g$ is equal to the input frequency $\omega_{in}$ minus the local oscillator frequency $\omega_{12}$. Of course, it is possible for the input beam to contain many input frequencies $\omega_{in1} \ldots \omega_{inN}$ (where N is an integer) to generate many generated frequencies through sum or difference generation. An important feature of this invention is that strongly driving the non-allowed transition causes the effective nonlinear susceptibility to be on the order of the linear susceptibility of the medium.

The above effect causes nonlinear generation to take place in a length which is on the order of one coherence length $L_c$, thus greatly reducing the need for phase matching. This coherence length $L_c$ is defined between a generating polarization, the generating polarization consisting of the first pump beam P1 the second pump beam P2 and the input beam, and the generated beam. This greatly reduces the need for phase matching, since the conversion takes place over such short length.

In certain systems the strongly-driven coherent superposition state is initiated by deliberately adding a specific two-photon detuning to the system and then allowing the fields to rise slowly—adiabatically—as compared to this two photon-detuning. In other words, the strongly-driven coherent superposition state is adiabatically initiated from the ground state |1> by adding a two-photon detuning from the two-photon transition between the ground state |1> and the second state |2>. These systems typically have many levels |i> and beams P1 and P2 both act on |1> to |i> and |2> to |i> transitions. To further improve performance the detuning is followed by chirping.

As mentioned above, the generated beam can also be produced by parametric oscillation. In this case the generated beam will consist of a signal frequency $\omega_s$ and an idler frequency $\omega_i$. The signal frequency $\omega_s$ and the idler frequency $\omega_i$ will sum to the local oscillator frequency $\omega_{12}$. An input beam at the signal frequency $\omega_s$, idler frequency $\omega_i$, or both can be applied to the nonlinear medium to amplify these frequencies.

Finally, the invention also provides for an apparatus to practice nonlinear frequency generation. The apparatus contains all the necessary components to practice the method of the invention. It is preferred that the first and second beam sources of this apparatus deliver single-mode beams. Also, it is preferred that at a fixed density the length of the nonlinear optical medium has a minimum value $L_{NL} = \pi/\beta$ set by the minimum number of atoms required for unity conversion efficiency for phase matched condition between the generating nonlinear polarization and the generated beam.

The invention will be best understood and appreciated upon reading the detailed description and reviewing the drawings referenced therein.

DESCRIPTION OF THE DRAWING FIGURES

DETAILED DESCRIPTION

Figure 1A:
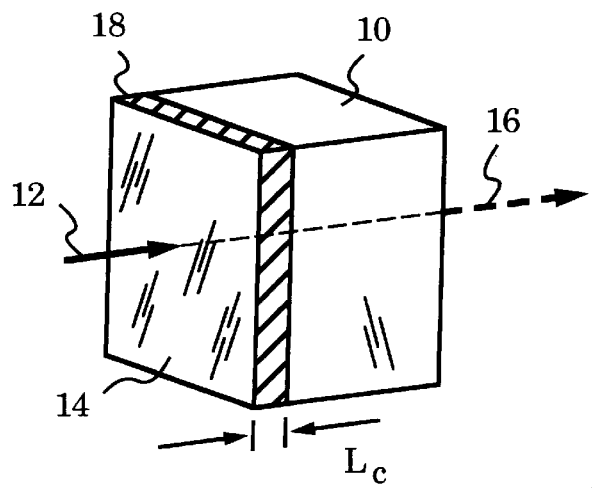
FIG. 1A is a three-dimensional view of a solid nonlinear medium.

To gain a better understanding of the invention, it is helpful to review the basics of nonlinear optical processes as practiced in the prior art. Nonlinear optical media capable of nonlinear generation processes, such as sum-and-difference generation or parametric generation, have been used for a long time. FIG. 1A illustrates a nonlinear optical medium 10 in the solid form, e.g., in the crystalline form. An input beam 12 enters medium 10 through a facet 14. Inside medium 10 a nonlinear conversion process generates an output beam 16. The frequency of output beam 16 differs from the frequency of input beam 12 as determined by the nonlinear process. Output beam 16 exits medium 10 through a facet opposite facet 14.

In practice, the nonlinear conversion process starts as soon as input beam 12 enters medium 10. In other words, input beam 12 induces the elementary entities, usually atoms or molecules, of medium 10 to generate output beam 16.

Since the frequency of input beam 12 differs from the frequency of output beam 16, the nonlinear polarization wave and the generated beam wave will not maintain a well-defined phase relationship as they propagate through medium 10. For ease of understanding we will refer to the waves of beams 12 and 16 by the same references, and in addition reference 12, once beam 12 is inside medium 10, also denotes a nonlinear polarization. The nonlinear polarization wave 12 and the generated wave 16 will "slip off" each other. The distance over which this slip reaches $\pi$ radians, i.e., from in phase to out of phase, is called a coherence length $L_c$. This distance is indicated on the side of medium 10 in FIG. 1A. In addition, a slice 18 or section of medium 10 corresponding to coherence length $L_c$ is hatched.

Figure 2:
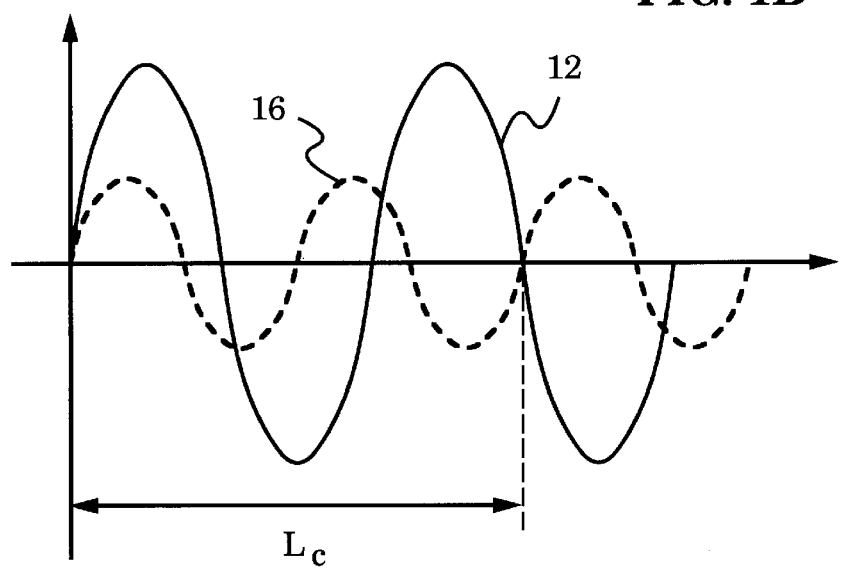
FIG. 2 is a graph illustrating the coherence length $L_c$ for beams in a prior art nonlinear conversion method.

The graph in FIG. 2 more clearly illustrates the mutual slip occurring between the polarization waves of beams 12 and 16. For convenience, the graphs representing the generating and generated polarizations are indicated by the same reference numbers as the corresponding beams. Thus, the solid sinusoidal curve represents the generating polarization due to input beam 12 while the dashed sinusoidal curve represents the generated polarization of output beam 16. In first coherence length $L_c$ energy is transferred from beam 12 to beam 16. In the second $L_c$, i.e. when beams 12 and 16 are out of phase, energy is transferred back from beam 16 to beam 12. Thus, useful nonlinear processes—transfer of energy from beam 12 to beam 16—take place while the polarization wave of beam 12 and beam 16 are phase matched, i.e., when they propagate in phase with minimal slip off. As shown in FIG. 2, after propagating for one coherence length $L_c$ the polarization waves of beam 12 and beam 16 are completely out of phase (out of phase by $\pi$ radians). This means that efficient nonlinear conversion only takes place inside section 18 of medium 10 and the remaining portion of medium 10 does not contribute positively for nonlinear conversion purposes. This is another reason for the low nonlinear conversion efficiencies already mentioned. In other words, phase matching is necessary to increase $L_c$ to the length of medium 10 for efficient conversion to take place.

It is understood that the number of beams, and thus the number of components making up the generating polarization, involved in the nonlinear generation process shown in FIG. 1A can vary. It is also clear that various prior art phase matching techniques can be employed to alleviate the phase matching problem. Unfortunately, these attempts, as already mentioned, do not always produce satisfactory results and are often extremely complicated in practice.

Figure 1B:
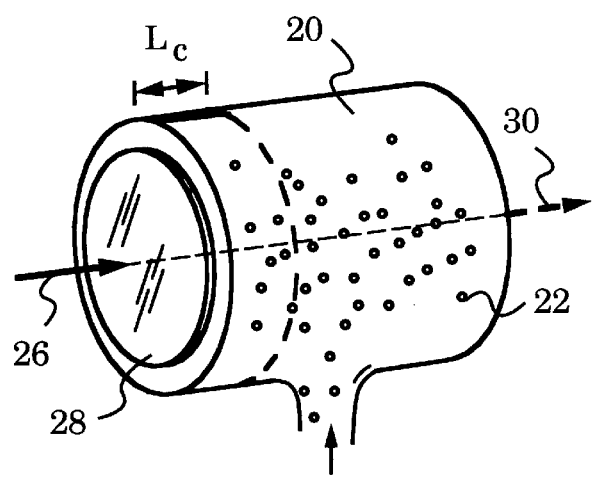
FIG. 1B is a three-dimensional view of a gaseous nonlinear medium contained in a cell.

FIG. 1B illustrates a cell 20 containing a nonlinear optical medium 22 in the gaseous form. The elementary entities are the gas particles shown in the path of an input beam 26, which enters cell 20 through a window 28. As in the first example, meaningful nonlinear conversion process will be limited to occur mostly within indicated coherence length $L_c$. Thus, an output beam 30 will exhibit a small amplitude. The situation is the same for other nonlinear media, e.g., liquids.

Figure 3:
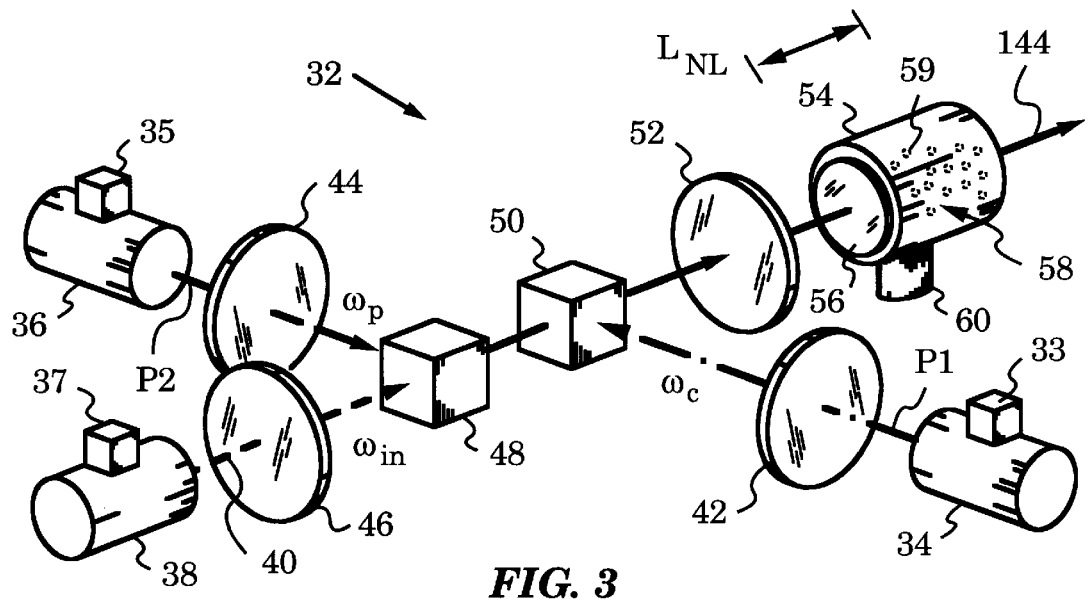
FIG. 3 is a three-dimensional view of an apparatus for practicing the method of the invention

The prior art limitations are overcome by the instant method. A simple and exemplary apparatus 32 for practicing the method of the invention is shown in FIG. 3. Apparatus 32 has a first beam source 34, a second beam source 36, and an input beam source 38. Adjustment mechanisms 33, 35 and 37 are provided to allow one to adjust the output intensity, the exact frequency, polarization and timing of sources 34, 36, and 38. Of course, sources with integrated adjustment mechanisms can also be used. Most preferably, sources 34, 36 and 38 are laser devices generating a first pump beam P1, a second pump beam P2 and an input beam 40 respectively. As further indicated, the frequencies of beams P1, P2 and 40 include a coupling frequency, $\omega_c$, a probe frequency, $\omega_p$, and an input frequency, $\omega_{in}$. Selection of the proper frequencies is a part of the method of the invention and will be addressed below.

Optical elements 42, 44 and 46, in this case lenses, are positioned in the paths of beams P1, P2 and 40 to ensure proper beam guidance and focusing. Two beam splitters 48 and 50 are arranged to combine input beam 40 with pump beam P2 and the combined beams 40 and P2 with pump beam P1. As is well-known in the art, any optical device or devices capable of combining the three beams can be used instead of beam splitters 48 and 50.

The way beams P1, P2 and 40 are combined is visualized by the arrows indicating the direction of propagation of each beam. Once together, the three beams pass through an optical element 52, or combination of optical elements and enter a cell 54 through a window 56. In some cases, adjustment of final beam size, energy, polarization will also be necessary. Appropriate apparatus and techniques to perform these adjustments are well known in the art.

Cell 54 contains a nonlinear optical medium 58, in this example a gas such as Pb. Elementary entities 59, in this case Pb atoms, are indicated. Specific characteristics of medium 58 rendering it suitable for practicing the method of the invention will be discussed below. Cell 54 is heated by a heating mechanism (not shown) to ensure that sufficient amount of atoms 59 rises from a repository area 60 and floats in the path of beams P1, P2 and 40. A generated beam 144 exits cell 54 through a second window (not shown).

It is important that apparatus 32 be capable of efficiently combining all three beams P1, P2 and 40 and applying them to nonlinear medium 58. This requirement can be met in many ways. A person skilled in the art will appreciate that apparatus 32 can be modified considerably to achieve this goal. For example, the ordering of lasers 34, 36 and 38 can be different from that shown in FIG. 3, depending on the optical requirements, optical path balance, beam losses and other parameters. Also, optical elements 42, 44, 46 and 52 can be replaced by other suitable optical elements. In some cases, these elements can be left out, provided that beams P1, P2 and 40 do not require collimating, focusing, or other beam guiding and shaping operations.

Another important aspect of laser sources 34 and 36 are their spectrally characteristics. This is because lasers 34 and 36 generate pump beams P1 and P2 which are crucial to establishing a strongly-driven coherent superposition state in atoms 59 of medium 58. In the simplest case lasers 34 and 36 have slowly varying envelopes in comparison to their optical cycle. For example, a Q-switched laser may be selected to have an envelope where the laser switches on and off in about 20 nsec. In this case it is important that both lasers be single-mode or have a Fourier-transform-limited linewidth dependent on the pulse duration. In some other arrangements, however, it is possible to use mode-locked lasers.

Figure 4:
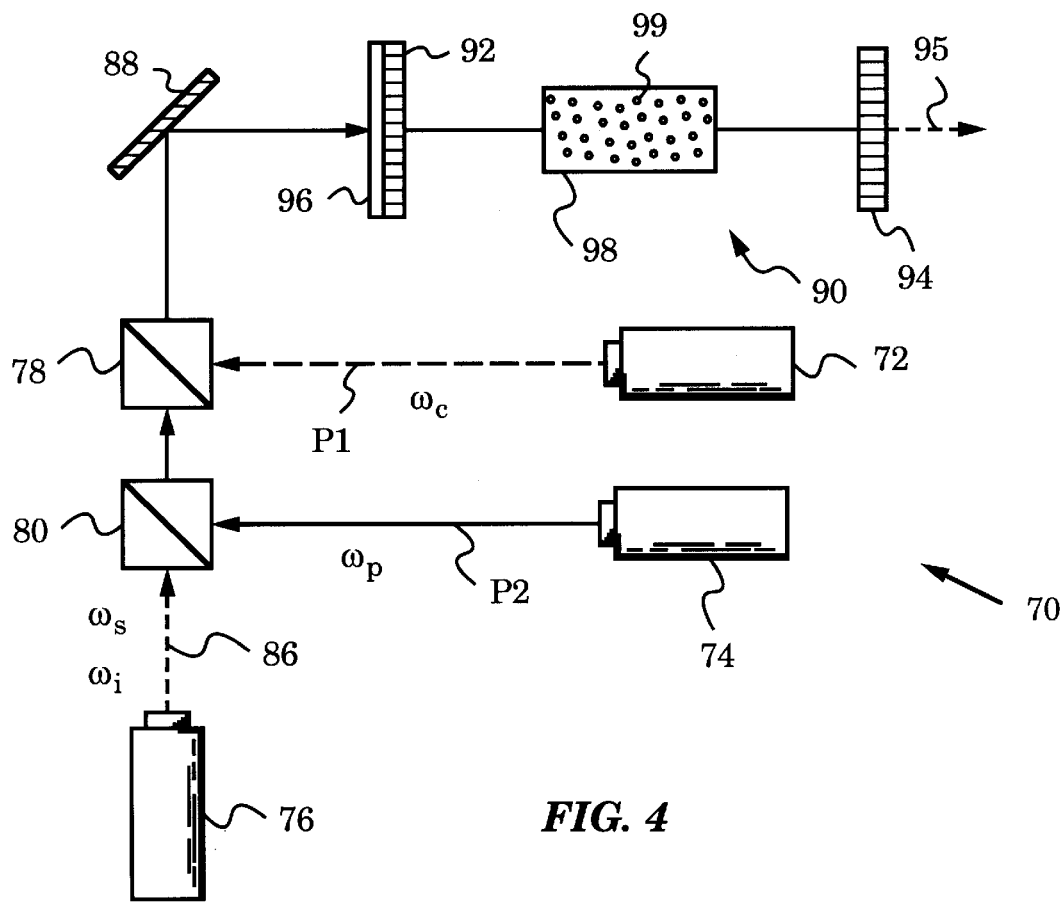
FIG. 4 is a top view of another apparatus for practicing the method of the invention, especially suited for parametric generation.

FIG. 4 illustrates another apparatus 70 with three laser sources 72, 74 and 76. In this embodiment sources 72, 74 and 76 have integrated intensity controls. Beam splitters 78 and 80 combine laser beams P1, P2 and 86 supplied by sources 72, 74 and 76 in a similar fashion to apparatus 32 of FIG. 3. In this embodiment beams P1 and P2 contain the coupling and probe frequencies $\omega_c$, $\omega_p$ and beam 86 provides a signal frequency, $\omega_s$, or an idler frequency, $\omega_i$, or both of these, as needed. Conventionally, the process of optical parametric amplification (OPA) always amplifies signal frequency $\omega_s$ and does not require an input at idler frequency $\omega_i$ at all. Thus, beam 86 does not generally contain $\omega_i$ when the method of the invention is employed in OPA. Also, in some cases beam 86 will not be required, thus rendering source 76 optional. The selection criteria for the frequencies and whether source 76 is necessary will be explained below.

A deflecting or 90° beam turning element 88, in this case a mirror, is positioned in the path of the combined beams to direct them to a cavity 90 along its optical axis. Two reflectors 92 and 94 define the length of cavity 90. As is well-known, along with the coatings on reflectors 92 and 94, the length of cavity 90 effectively determines what frequencies of electromagnetic radiation will be selected and amplified in the cavity.

Beams P1, P2 and 86 enter cavity 90 through reflector 92, which has a suitable coating layer 96 for admitting light at frequencies including coupling frequency $\omega_c$, probe frequency $\omega_p$ and signal frequency $\omega_s$ (or, possibly idler frequency $\omega_i$ or both $\omega_s$ and $\omega_i$) A person with average skill in the art will know how to choose suitable coatings to admit light at desired frequencies into cavity 90.

A nonlinear optical medium 98 is arranged inside cavity 90 in the path of the beams admitted through reflector 92. In this embodiment medium 98 is in the solid form. In fact, medium 98 was preferably a nonlinear crystal for traditional parametric generation. Elementary entities 99 of medium 98 are either atoms, molecules, or other suitable entities in solid, liquid, gaseous, and plasma form. The arrangement of crystal 98 inside cavity 90 renders this embodiment particularly suitable for practicing a method of the invention involving parametric generation, as described below. A generated beam 95 exits cavity 90 through reflector 94. This type of reflector is sometimes called an output coupler.

The apparatus illustrated in FIG. 3 and FIG. 4 can be used to practice many embodiments of the method according to the instant invention. Nonetheless, independent of the apparatus and type of nonlinear generation—sum, difference, or parametric generation—to be practiced, the first steps in each embodiment of the method will be the same. These steps will now be explained based on FIGS. 5 and 6.

Figure 5:
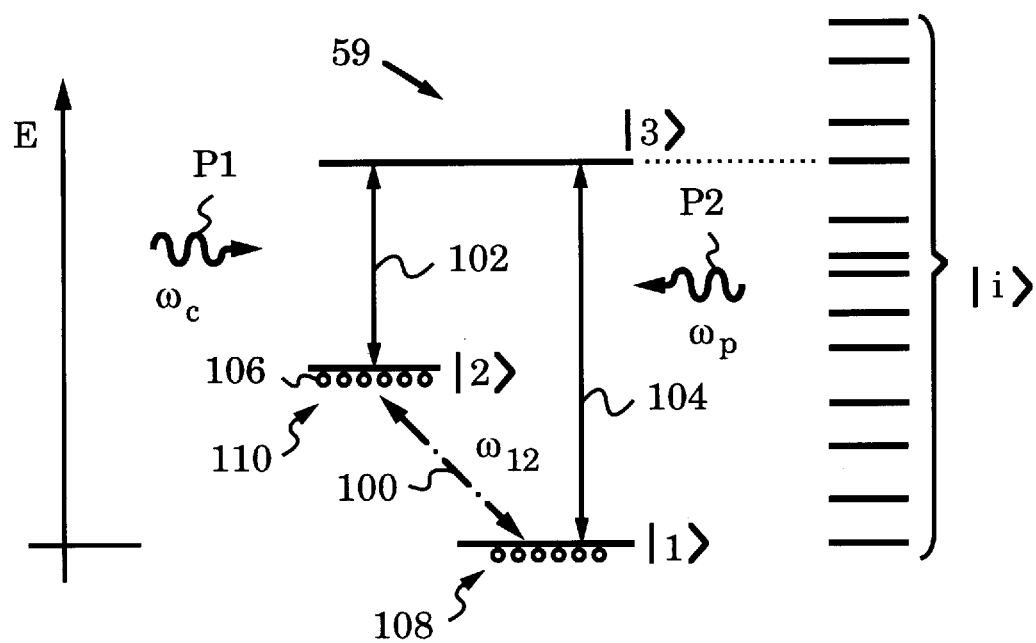
FIG. 5 is an energy level diagram of a Λ system prepared for nonlinear generation according to the invention.

FIG. 5 shows the energy level diagram of elementary entities 59 of nonlinear medium 58. In fact, this type of level diagram is applicable to atoms, molecules, or any other entities which have a well-defined energy level structure. The absorption of electromagnetic radiation, or photons, causes the population of electrons from lower energy states to be "kicked up" to higher energy levels. When these electrons "drop" to lower energy level they re-emit the absorbed energy in the form of photons. The y-axis on the left side indicates the direction of increasing energy E. For convenience, a ground state |1> of entity 59 coincides with the origin on the y-axis.

Typically, an entity 59 will have many energy levels or states |i> at various energies. These states |i> are indicated on the right hand side. From among states |i> one selects ground state |1> and a second state |2> such that a transition 100 between these states is dipole forbidden. This means that no single photon encountering entity 59 will be able to cause an electron to jump directly from ground state |1> to second state and that no electron will be able to "drop" or decay directly from second state |2> to ground state |1> and re-emit a corresponding photon. In other words, a one-photon transition between states |1> and |2> is not possible. It should be noted that in the case of solids or liquids one should interpret forbidden transition 100 to be an excitation of the entire medium. As one example, forbidden transition 100 may be a phonon mode.

An upper state |3> is selected from among states |i>. In FIG. 5 upper state |3> has a higher energy than second state |2> thus defining a Λ system in the gas atoms 59 of medium 58. A first transition 102 between second state |2> and upper state |3> and a second transition 104 between ground state |1> and the upper state |3> are both allowed. This means that photons which carry energies corresponding to transitions 102 or 104 will be absorbed and photons of equivalent energies will be emitted by entity 59. Correspondingly, electrons 106 will be able to migrate between states |1>, |2> and |3>.

A configuration, called the strongly-driven coherent superposition state, is produced by applying to medium 58 first pump beam P1 at coupling frequency $\omega_c$ and second pump beam P2 at probe frequency $\omega_p$ at high intensity levels. Frequencies $\omega_c$ and $\omega_p$ are chosen such that the photons of pump beams P1 and P2 have energies corresponding to transitions 102 and 104 respectively. When the Λ system of FIG. 5 is in this configuration electron populations 108 and 110 are in ground state |1> and in second state |2>. Note the absence of electrons in upper state |3>. Frequencies $\omega_c$ and $\omega_p$ can be calculated based on the relation E=hω, where h is the Planck's constant and E is the photon energy. The energies of the various states |i> for any atom or molecule can be found in the literature.

In addition to having the correct frequencies, i.e., $\omega_c$ and $\omega_p$, beams P1 and P2 also have to be applied to nonlinear medium 58 in a prescribed order. Pump beam P1 is applied before pump beam P2 such that medium 58, or more precisely its atoms 59, are rendered transparent and refractively thin to second pump beam P2. That it because applying beam P1 at coupling frequency $\omega_c$ first renders medium 58 transparent and refractively thin to photons whose energy corresponds to transition 104, i.e., photons of pump beam P2 at frequency $\omega_p$. In effect, when $\omega_c$ and $\omega_p$ are precisely matched to transitions 102 and 104 medium 58 turns transparent to radiation at $\omega_p$ (this is referred to as the on resonance condition). The refractively thin condition is achieved when $\omega_c$ and $\omega_p$ are detuned from transitions 102 and 104. In a refractively thin system the phase shift experienced by light traveling through it can be described as $\Delta\phi=\beta L$, where $\beta$ is the propagation constant and L is the length of medium 58. Thus, the phase shift, $\Delta\phi$, for a weak pump beam P2 alone, i.e., weak $\omega_p$, is equal to the product $\beta_p L$. For a system to be considered refractively thick the following condition must hold $\beta_p L \gg 1$. In contrast, for a refractively thin system it is required that $\beta_p L \ll 1$. The physical definition of $\beta_p$ is:

$$\beta_p = \frac{\omega_p N_E |\mu_{13}|^2}{2c\epsilon_o \hbar} \cdot \frac{1}{\Delta\omega_3}$$

where $|\mu_{13}|$ is the matrix element, c is the speed of light, $\epsilon_o$ is the permittivity, $\Delta\omega_3$ is the detuning from the transition and $\hbar$ is Planck's constant divided by $2\pi$.

Actually, when practicing the method of the invention, given a density of gas atoms 59 the length of cell 54 is fixed. The density of the gas can be controlled directly by temperature adjustment. Meanwhile, the length of cell 54 has a minimum value $L_{NL}=\pi/\bar{\beta}$ set by the minimum number atoms 59 required for unity conversion efficiency for phase matched condition between the generating polarization due to beams P1, P2 and 40 and generated polarization or generated beam 144. The average propagation constant $\bar{\beta}$ is defined as:

$$\bar{\beta} = \sqrt{\beta_{in} \cdot \beta_{generated}} \quad ,$$

where $\beta_{in}$ and $\beta_{generated}$ are the propagation constants at frequencies $\omega_{in}$ and $\omega_{g}$.

The lag in time before applying beam P2 is usually on the order of a few nano or pico seconds. Thus, the temporal pulse of beam P1 will start before the pulse of beam P2 begins its rise. Also, the pulse due to beam P2 should preferably terminate before the pulse of beam P1, although this may not be required. In this sense the pulse of beam P2 is usually enveloped by the pulse of beam P1. The effect of rendering a medium transparent and refractively thin to radiation is called Electromagnetically Induced Transparency (EIT). This phenomenon is described by S. E. Harris et al. in *Nonlinear Optical Processes using Electromagnetically Induced Transparency*, Physical Review Letters, March 1990, Vol. 64, pp. 1107–1110 and by A. Kasapi et al. in *Electromagnetically Induced Transparency: Propagation Dynamics*, Physical Review Letters, March 1995, Vol. 74, pp. 2447–2450. These teachings are hereby incorporated by reference.

In addition to applying beam P2 to nonlinear medium 59 after beam P1, it is crucial that the intensity of beam P2 be increased to a level near that of the intensity of beam P1. This is done by using intensity and frequency adjustment mechanism 35 (see FIG. 3). In fact, it is this adjustment that creates the strongly-driven coherent superposition state illustrated in FIG. 5. In a preferred embodiment of the method, the intensity of pump beam P2 should be equal to at least one tenth the intensity of pump beam P1. In other embodiments the two intensities should be nearly or exactly equal.

In another embodiment of the method the strongly-driven coherent superposition state is adiabatically initiated from ground state |1> by adding a two-photon detuning from two-photon transition between ground state |1> and second state |2>. In other words, frequencies $\omega_c$ and $\omega_p$ are initially off by some small quantity $\Delta\omega$, which can be different for each beam. This quantity, $\Delta\omega$, is adjusted using mechanisms 33 and 35. A person skilled in the art will appreciate that exact adjustments will have to be made on a case-by-case basis. In general, however, the detuning will range between a small fraction of a wave number to a few wave numbers. To further improve performance the detuning is followed by chirping. This, again, is a step which depends on the arrangement and the amount of chirping will be dictated by the system used. Mechanisms 33 and 35 have to be sufficiently responsive to allow for chirping within a fraction of a wave number. It is also possible to produce chirping by inserting additional optical devices in the paths of beams P1 and P2. Such devices are well-known in the art.

Alternatively, the intensity of pump beam P2 is increased to within one order of magnitude of the intensity of pump beam P1. In this case a Rabi frequency $\Omega_c$ due to beam P1 alone, is on the order of magnitude of a Rabi frequency $\Omega_p$ caused by beam P2 alone. It is well known that the Rabi frequency is directly related to the intensity of radiation. Thus, defining the relative intensity of beams P1 and P2 in terms of Rabi frequencies $\Omega_c$ and $\Omega_p$ is just an alternative method of specifying the intensities which will produce the strongly-driven local oscillator.

Independent of how the strongly-driven local oscillator is prepared, the number of photons $n_{P1}$ in first pump beam P1 has to be controlled. For best results the number of photons in beam P1 should exceed the local oscillator strength weighted number $N_E$ of entities 59 in the path of beam P1 through cell 54. The weighting factor is based on the strengths of allowed transitions 102 and 104. The strength of transition 102 between states |2> and |3> is denoted by $f_{23}$ and the strength of transition 104 between states |1> and |3> is represented by $f_{13}$. Thus, optimal conditions are ensured by obeying the following relation:

$$(f_{13}/f_{23}) (N_E/n_{P1}) << 1$$

The reason for this is that the EIT effect is improved as the number of photons in pump beam P1 grows (for more in-depth discussion refer to S. E. Harris et al. *Preparation Energy for Electromagnetically Induced Transparency Physical Review*, August 1995, A 52, R928–R931). In fact, the above equation is a guideline. A practical apparatus may function at, e.g., $(f_{13}/f_{23}) (N_E/n_{P1}) \approx 1$, and will always function for first pump beam P1 stronger than that, although, after a certain point, at no improvement in the strength of the local oscillator (see EXAMPLES section). Another practical apparatus may be operated at $(f_{13}/f_{23}) (N_E/n_{P1}) \approx 1/10$. Some of the experimental results derived by the applicants were performed even at values as low as $\approx 1/40$.

The preparation of the strongly-driven local oscillator requires a condition on the a.c. Stark shift produced in atoms 59 by the photons of beam P1. In particular, the intensity of beam P1 is adjusted such that the a.c. Stark shift exceeds the inhomogeneous linewidth of forbidden transition 104. Such adjustment can be easily performed by one skilled in the art.

To further optimize the strongly-driven oscillator the temporal pulse length of pump beam P2 should be shorter than or on the order of the dephasing and/or homogeneous lifetime of forbidden transition 104. Actual figures and pulse durations will be given in the examples presented below.

The absolute intensities of beams P1 and P2 will, of course, depend on medium 58 and other parameters of system 32. In general, however, these intensities will range from fractions of a MW/cm$^2$ to several hundred MW/cm$^2$. Specific figures will be given in the examples below.

The strongly-driven coherent superposition state is achieved once the beams P1 and P2 have been applied and adjusted in the manner described above. The immediate result of maintaining populations 108 and 110 in the coherent superposition state is the creation of a strongly-driven local oscillator at a local oscillator frequency $\omega_{12}$. In effect, local frequency $\omega_{12}$ corresponds to the frequency of forbidden transition 100. Thus, entity 59 of medium 58 kept in the strongly-driven coherent superposition state will act as an oscillator which is used in nonlinear generation as described below.

The creation of the strongly-driven local oscillator is a very crucial and completely unanticipated step in practicing the method of the invention. In conventional EIT applications, the use of a high-intensity beam P2 is not even considered. Thus, the term strongly-driven indicates the application of high intensity beams P1 and P2 used to create the local oscillator.

Figure 6:
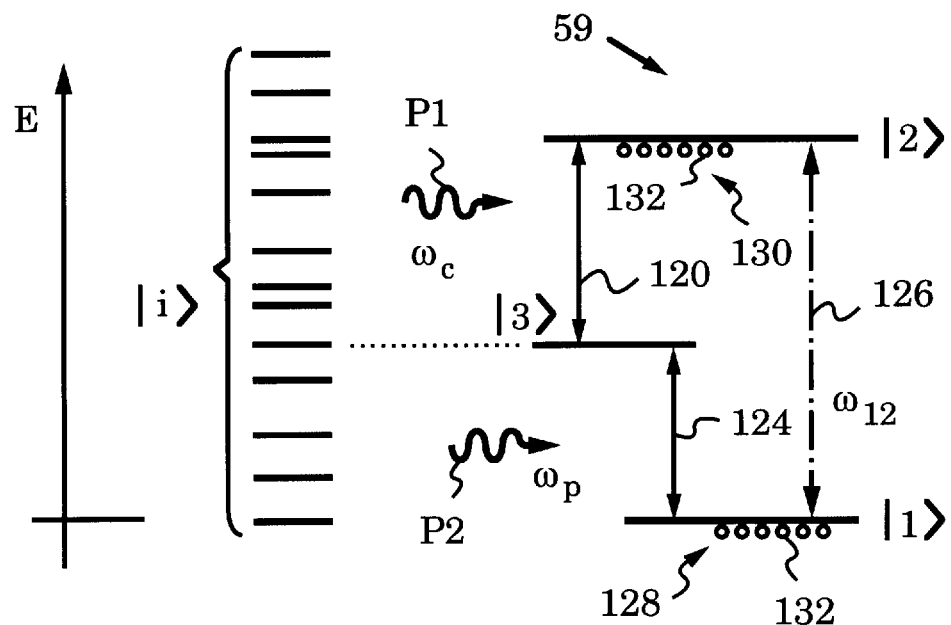
FIG. 6 is an energy level diagram of a ladder system prepared for nonlinear generation according to the invention.

Before discussing the nonlinear generation process, we will consider another possible system in which the strongly-driven local oscillator effect is produced according to the invention. The mechanics of the nonlinear generation process are very closely related in both systems. In fact, FIG. 6 illustrates another system, also called the ladder system, produced in an atom 59 of medium 58. The ladder system differs from the Λ system in that upper state |3> is selected from states |i> at an energy lower than that of second state |2>.

As in the Λ system, a first transition 120 between second level |2> and upper level |3> and a second transition 124 between ground state |1> and upper state |3> are allowed. The energies of transitions 120 and 124 correspond the energies of photons at coupling frequency $\omega_c$ contained in first pump beam P1 and photons at probe frequency $\omega_p$ supplied by second pump beam P2 respectively. A transition 126 between ground state |1> and second state |2> is dipole forbidden.

The strongly-driven coherent superposition state in which populations 128 and 130 of entity 59 (in this case electrons 132 of atoms 59) are trapped in states |1> and |2> is obtained in the same way as in the Λ system. First, pump beam P1 at coupling frequency $\omega_c$ is applied to medium 58. Then, beam P2 at probe frequency $\omega_p$ is applied and its intensity increased to within an order of magnitude of the intensity of pump beam P1. The strongly-driven coherent superposition state establishes a strongly-driven local oscillator at local oscillator frequency $\omega_{12}$ corresponding to forbidden transition 126.

Nonlinear generation according to the invention is possible in the Λ system and in the ladder system once they are in the strongly-driven coherent superposition state. The nonlinear processes of sum generation and difference generation in atoms 59 of medium 58 are shown in FIGS. 7 and 8 respectively.

Figure 7:
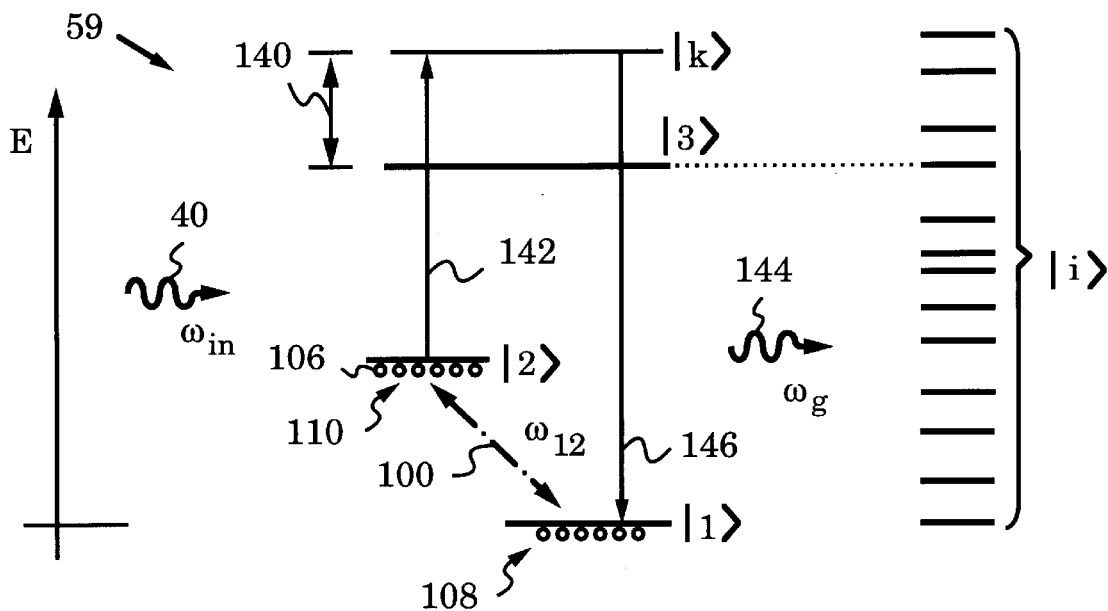
FIG. 7 is an energy level diagram illustrating sum generation in the Λ system of FIG. 5.
Figure 8:
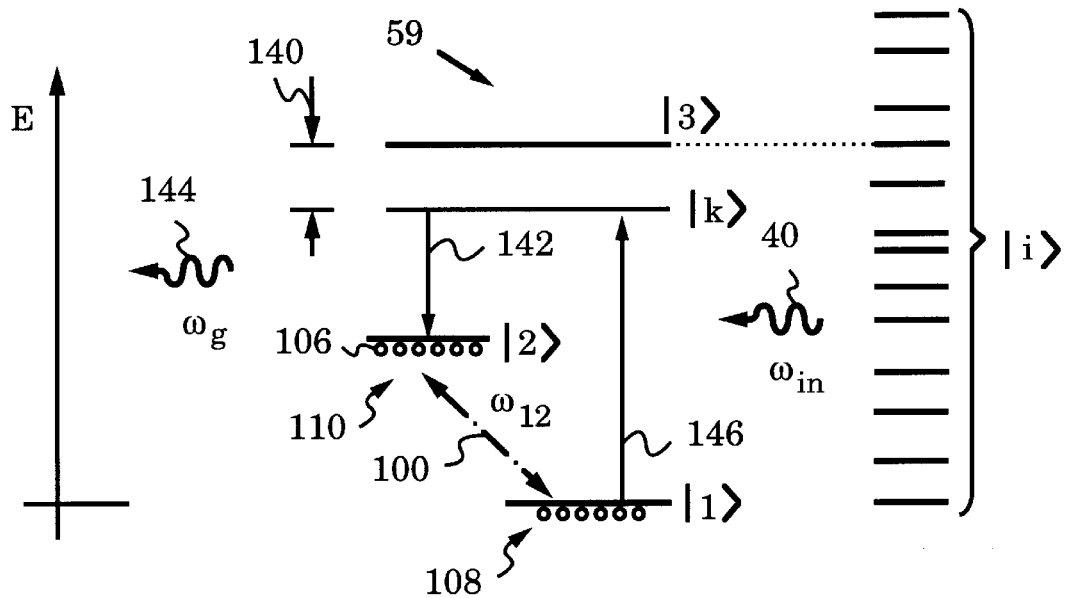
FIG. 8 is the diagram of FIG. 7 illustrating difference generation in the Λ system of FIG. 5.

FIG. 7 illustrates sum generation in the Λ system. Input beam 40 at frequency $\omega_{in}$ is applied to atom 59. Frequency $\omega_{in}$ is detuned from transition 102, as indicated by a detuning 140, which may range from a few wave numbers to several thousand wave numbers. In fact, ranges of $10^3$ to $10^5$ wave numbers are desirable if one wishes to derive output frequencies which differ considerably from the frequencies of beams P1, P2, or 40.

Thus, frequency $\omega_{in}$ corresponds to a transition 142. In fact, transition 142 can be chosen between second state |2> and any of available energy levels |i> with or without detuning from that chosen level. In this case the chosen level |k> is just state |3> minus detuning 140. Level |k> does not correspond to any of energy levels |i> and is therefore called a virtual state. Actual systems will be shown in the examples to follow.

The application of input beam 40 at $\omega_{in}$ to medium 58 results in generated beam 144 at generated frequency $\omega_g$ (see FIG. 3). According to the principle of sum generation, the following relationship describes generated frequency $\omega_g$:

$$\omega_g = \omega_{in} + \omega_{12}$$

for any frequency band. As illustrated, frequency $\omega_g$ actually corresponds to a transition 146 from virtual state |k> to ground state |1>.

FIG. 8 shows difference generation in the same Λ system. In this case input frequency $\omega_{in}$ of input beam 40 corresponds to transition 146. As a result, generated frequency $\omega_g$ of beam 40 corresponds to transition 142. Thus, the situation is reversed from that in FIG. 7. The following equation describes difference generation:

$$\omega_g = \omega_{in} - \omega_{12}$$

for any frequency band. It is understood, that many input beams at different frequencies $\omega_{in1}$ to $\omega_{inN}$, where N is an integer, can be used for sum or difference generation in the Λ system. These generation processes can take place concurrently or independently. Of course, for converting many input beams input source 36 has to be a tunable laser or consist of several independent laser sources or lasers running in multi-mode. Otherwise, input source 36 may produce a broad band of input beam frequencies by having a short time scale, e.g., having a pulse length in the femtosecond—picosecond range. Methods of providing beams using lasers are well-known to those skilled in the art.

Figure 9:
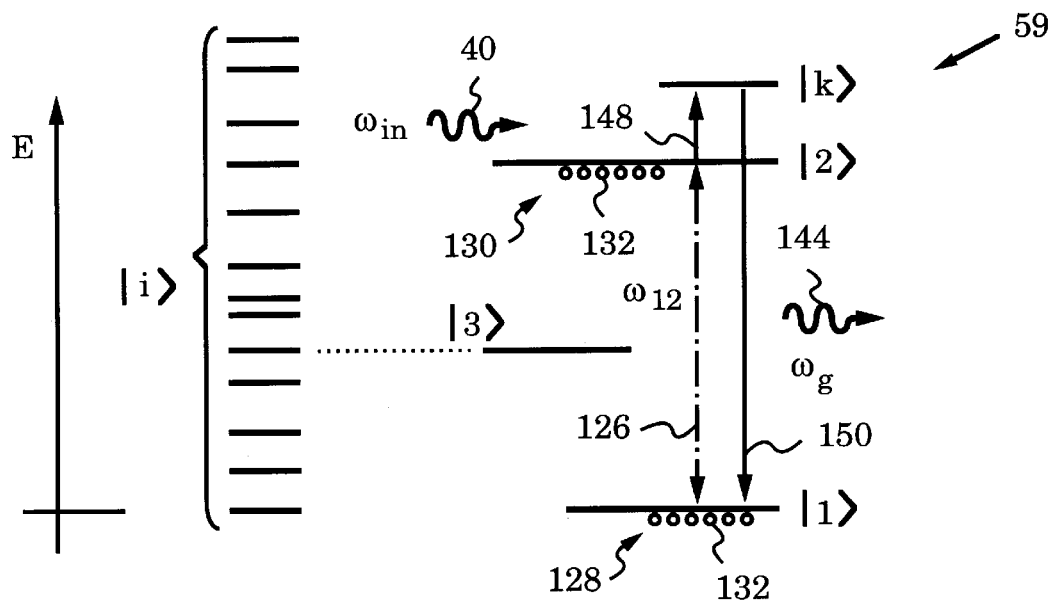
FIG. 9 is an energy level diagram illustrating sum generation in the ladder system of FIG. 6.
Figure 10:
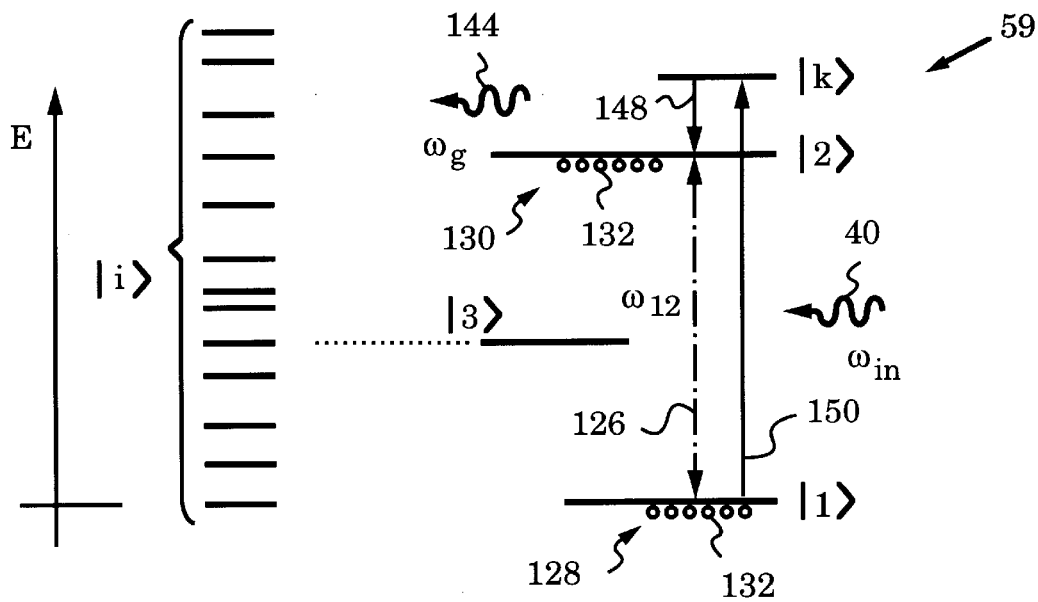
FIG. 10 is the diagram of FIG. 9 illustrating difference generation in the ladder system of FIG. 6.

FIGS. 9 and 10 illustrate sum and difference generation in the ladder system of FIG. 6. The equations are the same as stated above for the Λ system. To obtain sum generation, as shown in FIG. 9, input frequency $\omega_{in}$ of input beam 40 corresponds to a transition 148 between second level |2> and chosen virtual state |k>. Such transitions between actual states and virtual states are also called virtual transitions. As a result, generated beam 144 has a generated frequency $\omega_g$ corresponding a transition 150 between virtual state |k> and ground state |1>. In difference generation, as shown in FIG. 10, the situation is reversed. Input beam 40 corresponds in its frequency $\omega_{in}$ to transition 150. Meanwhile, generated beam 144 has frequency $\omega_g$ corresponding to transition 148.

An important aspect of the invention is that the efficient nonlinear sum or difference generation in the Λ and ladder systems takes place within a very short length inside medium 58. In fact, the conversion or generation preferably takes place within one coherence length $L_c$ defined between a generating polarization and generated beam 144. Generating polarization is the combined effect of beams P1, P2 and input beam 40. In other words, generating polarization is the response of the medium to all the light beams entering medium 58. This situation is different from FIG. 2 in that four frequencies (assuming only one input beam 40), $\omega_c$, $\omega_p$, $\omega_{in}$ and $\omega_g$ have to be taken into account in defining coherence length $L_c$. The phases of beams P1, P2 and 40 create the generating polarization phase $\phi$.

Generated beam 144 is assigned phase $\Phi$. In analogy to FIG. 2, the coherence length $L_c$ is the length over which $\phi$ and $\Phi$ slip off from being in phase to being $\pi$ radians out of phase. Because efficient generation takes place within one coherence length $L_c$ the need for phase matching is greatly reduced or, in some cases, even eliminated. In fact, since coherence length is defined as:

$$\Delta k L_c = \pi$$

in the present case one can consider differential k-vector, $\Delta k$, to have two components: a non-linear component, $k_{NL}$, and a generated component, $k_g$. This translates into:

$$\Delta k = k_{NL} - k_g$$

where $$k_{NL} = f(k_c, k_p, k_{in}).$$

In other words, we consider the nonlinear component of the differential k-vector to be a function of the k-vectors of all the beams (P1, P2, 40) making up the generating polarization. To improve generation efficiency $\Delta k$ should be as small as possible. This condition makes coherence length $L_c$ increase.

In practicing the method of the invention a small two-photon detuning, i.e., detuning w is used to minimize $\Delta k$ for this purpose. It is an important detail of this invention that a small detuning be effectuated by varying frequencies $\omega_c$ and $\omega_p$ of pump beams P1 and P2 from first and second transitions 102 and 104 in the Λ system and transitions 120 and 126 in the ladder system. This detuning from two-photon resonance varies the phase shift of the strongly-driven local oscillator, thereby allowing compensation for a small phase mismatch $\Delta k$. The resultant adjustment of $\Delta k$ is very important for sum-and-difference generation and crucial for parametric generation according to the invention. The actual adjustment necessary will be determined on a case-by-case basis. The examples below will illustrate high generation efficiencies obtained over the distance of one coherence length $L_c$ obtained by the method of the invention with and without detuning.

Both the Λ and ladder systems can be used for parametric generation. Apparatus 70 of FIG. 4 is more suitable for this purpose than apparatus 32 of FIG. 3. In a preferred parametric generation method the length of cavity 90 is selected to amplify a signal frequency $\omega_s$ of generated beam 95, also called the signal beam. As already indicated, laser source 76 will not be required in some cases. That is because, as is well-known in the art, signal and idler frequencies, $\omega_s$ and $\omega_i$, are generated inside medium 98 by amplification of inherent noise. Since the length of cavity 90 is properly set to amplify noise at signal frequency $\omega_s$, generated beam 95 will contain signal frequency $\omega_s$.

It is also possible to extract from cavity 90 generated beam 95 containing idler frequency $\omega_i$ by choosing a suitable output coupler 94. When required, source 76 can be used to apply input beam 86 at either signal frequency $\omega_s$, idler frequency $\omega_i$ or both. Portions of beam 95 at both frequencies are amplified under these conditions. In this arrangement parametric generation can be used for amplification purposes. Also, since signal frequency $\omega_s$ can be tuned by adjusting the length of cavity 90 (or by other methods known in the art), parametric generation apparatus 70 can be used as a variable frequency amplifier.

Figure 11:
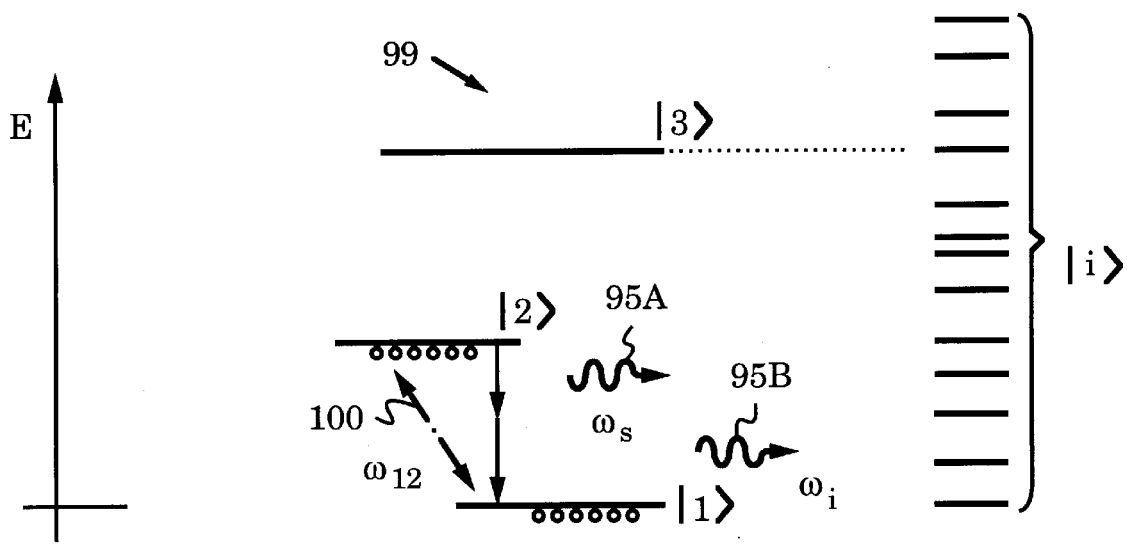
FIG. 11 is an energy level diagram illustrating parametric generation in the Λ system of FIG. 5.

The mechanism of parametric generation in the Λ system set up in elementary entities 99, e.g., molecules, of medium 98 is best illustrated in FIG. 11. For clarity, the two portions of beam 95 corresponding to signal and idler frequencies $\omega_s$ and $\omega_i$ have been labeled by 95A and 95B respectively. The equation governing parametric generation, $$\omega_{12}=\omega_s+\omega_i$$

indicates that the frequencies of beam portions 95A and 95B sum to the frequency of forbidden transition 100, i.e., local oscillator frequency $\omega_{12}$. Clearly, $\omega_s$ and $\omega_i$ are thus widely tunable.

Figure 12:
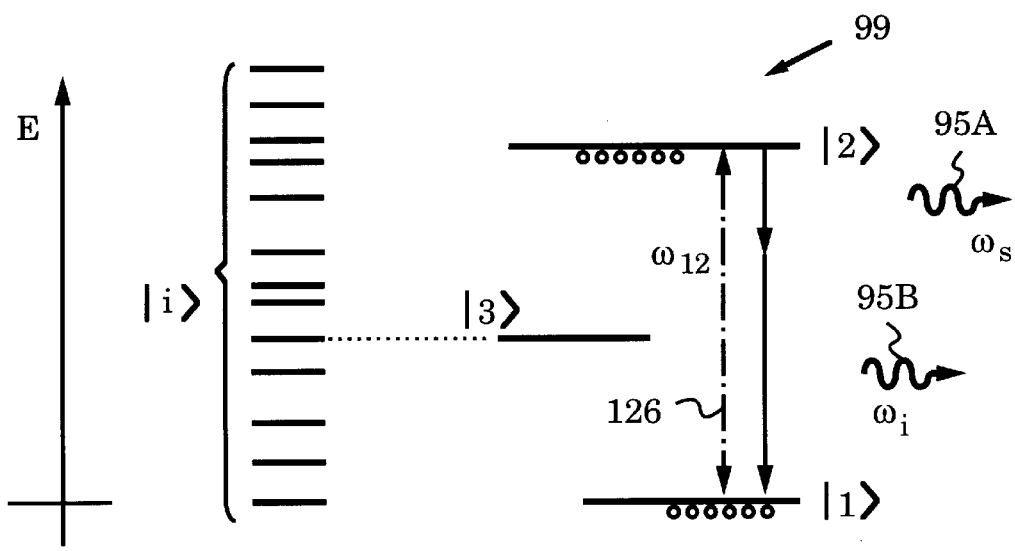
FIG. 12 is an energy level diagram illustrating parametric generation in the ladder system of FIG. 6.

FIG. 12 illustrates parametric generation in the ladder system. The process is governed by the same equation as in the Λ system. Beam portions 95A and 95B contain signal and idler frequencies $\omega_s$ and $\omega_i$ summing to local oscillator frequency $\omega_{12}$, which corresponds to forbidden transition 126.

In fact, efficient sum and difference generation or parametric generation in either the ladder or Λ systems depend on setting up the strongly-driven coherent superposition state. With the aid of the resulting strongly-driven local oscillator nonlinear frequency generation processes can be performed over unprecedentedly short distances in nonlinear media, i.e., distances on the order of one coherence length $L_c$.

The above arguments explain the fundamentals behind practicing the invention to achieve nonlinear frequency generation. Now, the invention will be further clarified based on practical examples.

EXAMPLE 1

In a first example the nonlinear generation method according to the invention was practiced in atomic Pb vapor. The system used was the Λ system which is analogous the one of FIG. 5 and the apparatus for practicing the method can be analogous in general aspects to the one of FIG. 3. Energy states |1>, |2> and |3> are the ones of $^{208}$Pb vapor corresponding to the following wave numbers: 0 cm$^{-1}$, 10,650 cm$^{-1}$ and 35,287 cm$^{-1}$. In this manner any detuning can be expressed directly in cm$^{-1}$. Meanwhile, rather than expressing the transitions into equivalent frequencies of light, the transitions are expressed in terms of wavelength. This notation is more convenient. The wavelengths, pulse widths, energies, beam areas, and intensities of laser beams P1, P2, 40, and 144 are listed in Table 1.

TABLE 1

| wavelength (nm) | laser pulse width (nsec) | laser energy (microJ) | laser beam area (mm²) | laser intensity (MW/cm²) |
| --- | --- | --- | --- | --- |
| P1 - 406 (first pump beam) | 39 | 3,200 | 0.27 | 30 |
| P2 - 283 (second pump beam) | 22 | 210 | 0.075 | 13 |
| 40 - 425 (input beam) | 26 | 400 | 0.63 | 2.4 |
| 144 - 293 (generated beam) | 21 | 16 | 0.075 | 1.0 |

In accordance with the method of the invention, first pump beam P1 at 406 nm was applied to the Pb vapor before applying beam P2 at 283 nm. Then the intensity of beam P2 was increased to 13 MW/cm². This produced the coherent superposition state in the Pb atoms. The intensities of beams P1 and P2 ensured that the superposition state was strongly-driven.

Figure 13:
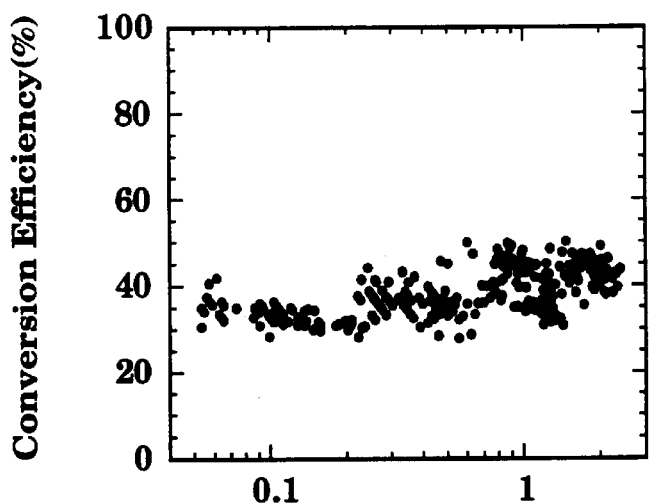
FIG. 13 is a graph of the generation efficiency vs. intensity of an input beam.

Once the strongly-driven local oscillator was established input beam 40 at 425 nm was mixed with the local oscillator to generate ultra-violet light at 293 nm. The generation efficiency for this process was approximately 40%. In fact, FIG. 13 shows a graph of the conversion or generation efficiency as a function of intensity of the input beam. It is clear that the 40% efficiency level is maintained independent of intensity.

Figure 14:
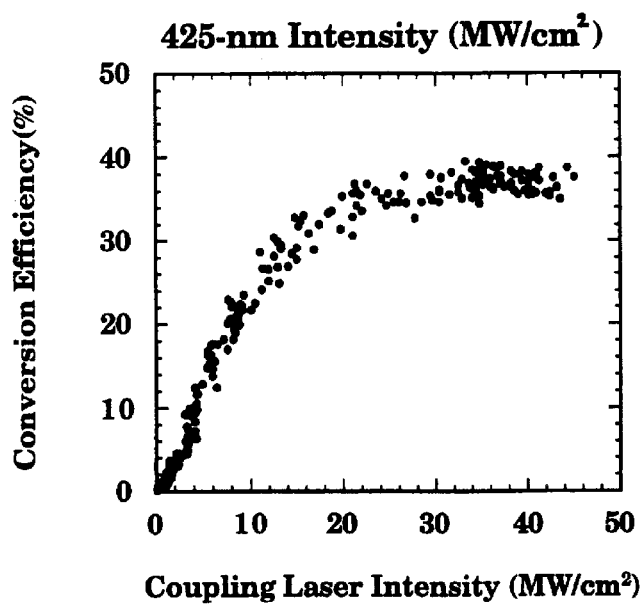
FIG. 14 is a graph of the generation efficiency vs. strength of a pump beam.

FIG. 14 illustrates the generation efficiency as a function of the intensity of first pump beam at 406 nm in MW/cm². It can be easily ascertained that the efficiency increases with increasing intensity. This is expected since, according to the above teaching, the local oscillator becomes stronger as the intensity of second pump beam increases. Beyond a certain point the local oscillator no longer benefits from raising the intensity of the second pump beam.

Figure 15:
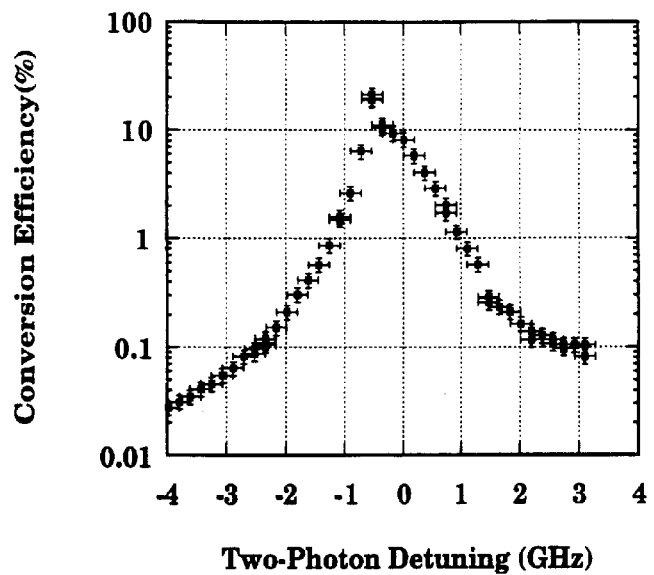
FIG. 15 is a graph of the generation efficiency vs. two-photon detuning.

FIG. 15 graphs the generation efficiency as a function of the detuning of the frequency of second pump beam P2 minus that of first pump beam P1 from the |1>–|2> resonance. As expected, the efficiency is highest near the two-photon transition resonance and is a very sensitive function of two-photon detuning. This underscores the necessity of using high-quality laser sources for supplying the first and second pump beams. A small two-photon detuning, in this case –0.5 GHz is necessary to compensate for small phase mismatch and thereby maximize the conversion efficiency. This is reflected by the dislocation of the graph's maximum to the left from perfect resonance which occurs at zero detuning.

EXAMPLE 2

Figure 16:
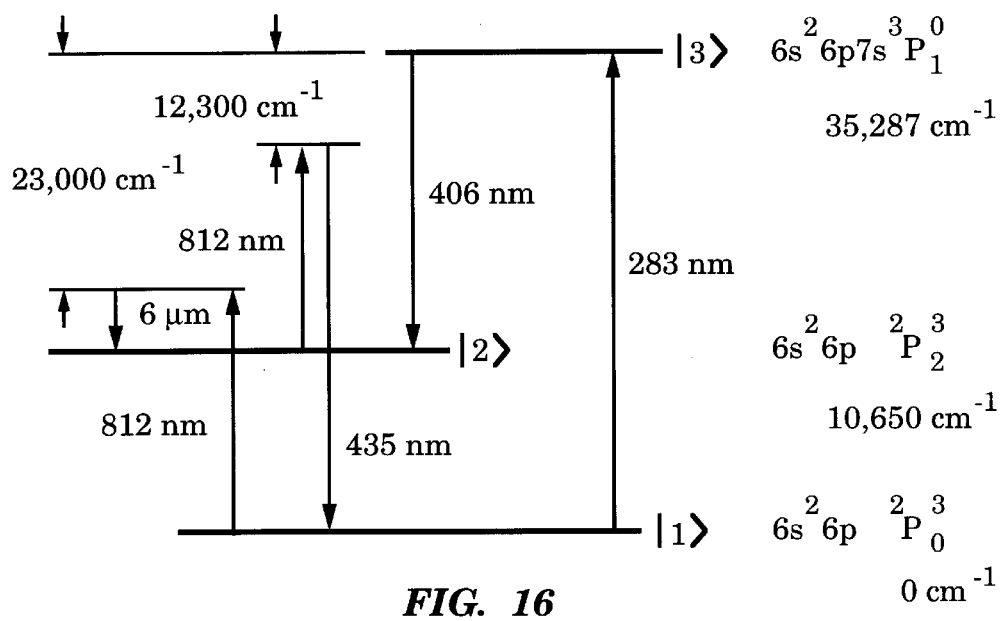
FIG. 16 is an energy level diagram for tunable infrared generation in Pb vapor.

In another example of the invention, the Λ system of Example 1 is used with a tunable laser near 800 nm rather than the 425 nm input laser. Details of the resulting tunable infrared generation in Pb vapor are illustrated in FIG. 16. The tunable 800 nm input beam mixes with the strongly-driven local oscillator to generate a tunable difference frequency. As the input tunable 800 nm laser is tuned from 720 nm to 936 nm, the output signal will tune from 3 μm to 300

μm. This experiment requires about a ten-fold increase in the product of atom density and cell length (NL≈$10^{18}$ atoms/cm$^2$). This broad tuning range also permits generation or conversion of a broad-spectrum (femtosecond scale) laser pulse centered near 800 nm to a corresponding femtosecond scale laser pulse in the mid-infrared region. Such a source is very useful in practice for ultra fast semiconductor devices and in processes involving chemical dynamics.

EXAMPLE 3

Figure 17:
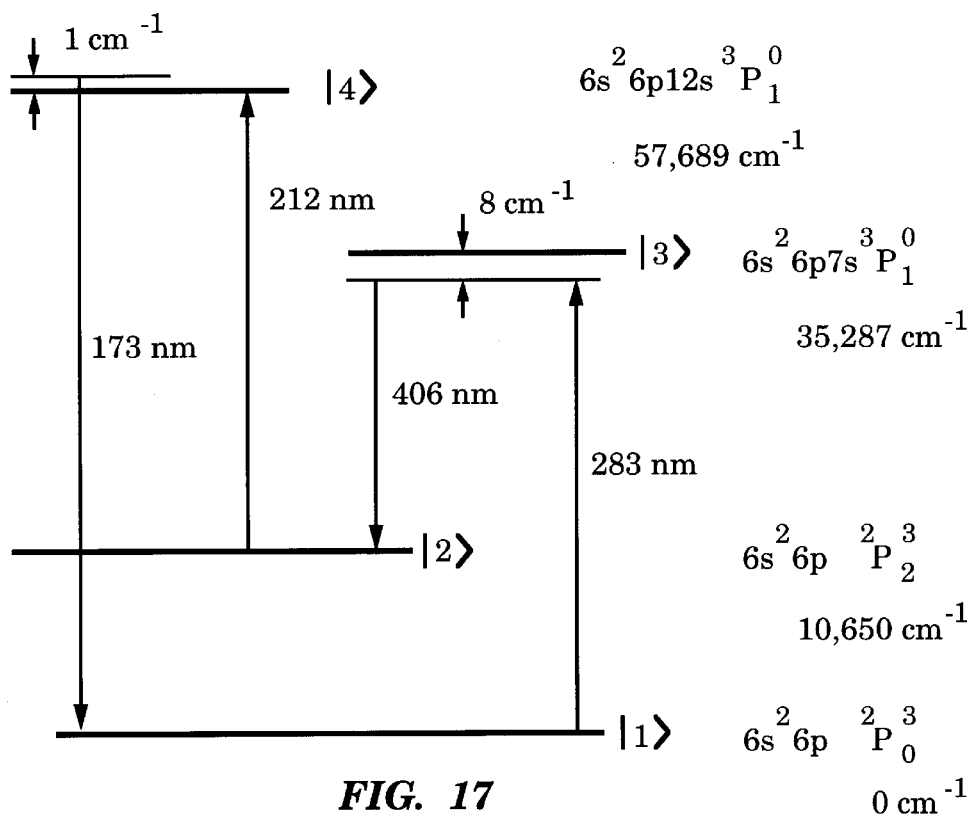
FIG. 17 is an energy level diagram for VUV generation in Pb vapor.

Another example embodiment of the invention is also based on the Λ system in Pb vapor. The 425 nm input beam is replaced with its second harmonic at 212 nm. This can be accomplished, e.g., by using a nonlinear crystal such as BBO to frequency-double the original output of the 425 nm laser, as is well-known in the art. FIG. 17 shows how the Λ system responds by generating VUV radiation at 173 nm. In particular, this involves the 6p12s level of Pb.

In another embodiment, the 425 nm input can be replaced with frequency-doubled pump beam P1 at 203 nm. This will generate VUV at 167 nm via the continuum in Pb. It is also possible to use the large width of the continuum for efficient, tunable VUV generation.

EXAMPLE 4

Figures 18A, 18B:
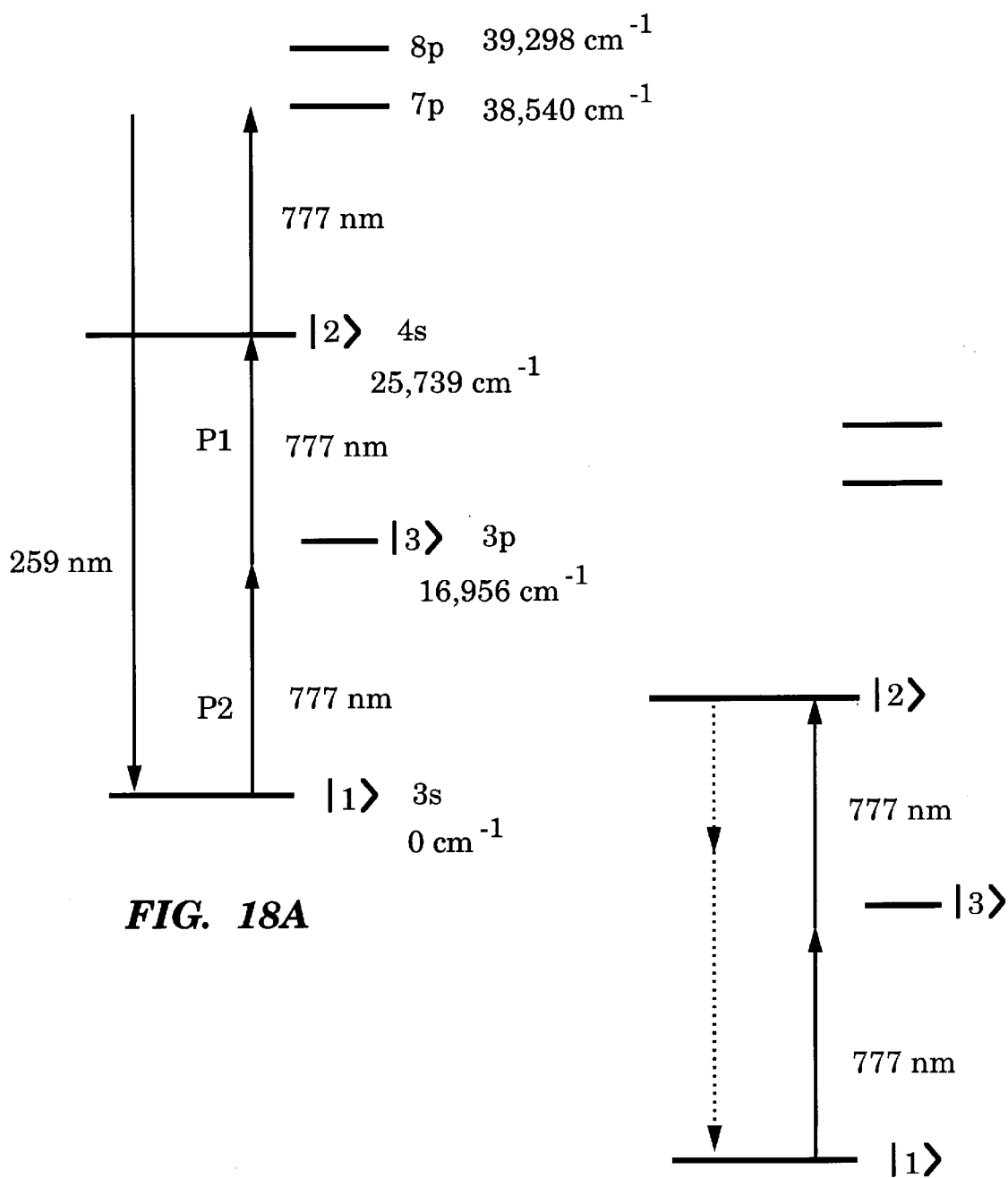
FIG. 18A is an energy level diagram for UV generation in Na vapor (ladder system).
FIG. 18B is another energy level diagram for parametric generation in Na vapor (ladder system).

In another embodiment a ladder system is used for generating UV radiation. Here, the medium can be Na vapor. An energy level diagram is shown in FIG. 18A and it involves the 3s, 3p, 4s and, in this instance, 7p states of atomic Na. Three photons of 777 nm radiation sum to produce a generated beam at 259 nm. The strongly-driven local oscillator is on the 3s to 4s transition (|1> to |2> transition). First and second pump beams are at the same frequency and the coherent superposition state is established by either a small detuning from two-photon resonance or a small detuning followed by a chirp in two-photon resonance. In an alternative embodiment, pump beams P1 and P2 have different frequencies summing to the value. In this case the coherent superposition state is produced by applying beam P1 before P2.

FIG. 18B shows a third configuration in atomic Na. The same frequency, i.e., 777 nm is applied to establish the strong local oscillator. Now, however, parametric generation and amplification of any two new frequencies which sum to the |1> to |2> transition becomes possible. Two such frequencies, the signal and the idler, are shown by the dotted lines in FIG. 18B. Either frequency can be amplified. If the density-length (NL) product is large enough and pump beams P1 and P2 intense enough, either of these frequencies may grow from noise and oscillate.

We also note here that the parametric gain (as shown by the dotted lines in FIG. 18B) is possible in-between the two states |1> and |2> of the basic Λ system of FIG. 5. This leads to substantial parametric gain over a large bandwidth.

It will be clear to a person skilled in the art that the above description and examples point out but a few of the possible embodiments. These embodiment and the teaching contained in the specification a will enable one to practice nonlinear generation across a wide range of frequencies and in many different arrangements. Accordingly, the scope of the invention should be determined by the following claims and their legal equivalents.

What is claimed is:

1. A method of nonlinear frequency generation using a nonlinear optical medium comprising elementary entities having a ground state |1> and a second state |2> such that the transition between said ground state |1> and said second state |2> is a dipole forbidden transition, said nonlinear optical medium further having an upper state |3> selected from the energy states |i> above said ground state |1> such that a two-photon transition between said ground state |1> and said second state |2> via said upper state |3> is allowed, said method comprising the following steps:

a) applying to said nonlinear optical medium a first pump beam P1 at a coupling frequency $\omega_c$ corresponding to a first transition between said second state |2> and said upper state |3>;

b) applying a second pump beam P2 at a probe frequency $\omega_p$ corresponding to a second transition between said ground state |1> and said upper state |3>;

c) adjusting the intensities of said first pump beam P1 and of said second pump beam P2 to produce a strongly-driven coherent superposition state of said ground state |1> and said second state |2>; said strongly-driven coherent superposition state creating a local oscillator at a local oscillator frequency $\omega_{12}$; and d) passing an input beam through said nonlinear optical medium to produce a generated beam having a generated frequency $\omega_g$.

2. The method of claim 1 wherein said upper state |3> is selected such that its energy level is higher than the energy level of said second state |2>, thereby forming a Λ system in said nonlinear optical medium.

3. The method of claim 1 wherein said upper state |3> is selected such that its energy level is lower than the energy level of said second state |2>, thereby forming a ladder system in said nonlinear optical medium.

4. The method of claim 1 wherein said first pump beam P1 is applied before said second pump beam P2 thereby modifying said nonlinear optical medium to render it transparent to said second pump beam P2.

5. The method of claim 4 wherein the intensity of said second pump beam P2 is increased to within one order of magnitude of the intensity of said first pump beam P1, whereby the Rabi frequency $\Omega_c$ of said first pump beam P1 is on the order of magnitude of the Rabi frequency $\Omega_p$ of said second pump beam P2.

6. The method of claim 1 wherein said first pump beam P1 is applied before said second pump beam P2 thereby modifying said nonlinear optical medium to render it refractively thin to said second pump beam P2.

7. The method of claim 6 wherein the intensity of said second pump beam P2 is increased to within one order of magnitude of the intensity of said first pump beam P1, whereby the Rabi frequency $\Omega_c$ of said first pump beam P1 is on the order of magnitude of the Rabi frequency $\Omega_p$ of said second pump beam P2.

8. The method of claim 1 wherein the intensity of said second pump beam P2 is equal to at least one tenth the intensity of said first pump beam P1.

9. The method of claim 1 wherein the number of photons $n_{P1}$ in said first pump beam P1 is selected to exceed the oscillator strength weighted number of said elementary entities $N_E$ in the path of said first pump beam P1 through said nonlinear optical medium such that $(f_{13}/f_{23})(N_E/n_{P1}) \ll 1$, where $f_{13}$ is the strength of transition between said ground state |1> and said upper state |3> and $f_{23}$ is the strength of transition between said second state |2> and said upper state |3>.

10. The method of claim 9 wherein said elementary entities are selected from the group of entities consisting of atoms and molecules.

11. The method of claim 1 wherein the intensity of said first pump beam P1 is such that the a.c. Stark shift in said nonlinear optical medium due to said first pump beam P1 exceeds the inhomogeneous linewidth of said dipole forbidden transition.

12. The method of claim 1 wherein the temporal pulse length of said second pump beam P2 is shorter than the dephasing/homogeneous lifetime of said dipole forbidden transition.

13. The method of claim 1 wherein the temporal pulse length of said second pump beam is on the order of the dephasing/homogeneous lifetime of said dipole forbidden transition.

14. The method of claim 1 wherein said generated beam is produced by nonlinear effects consisting of sum generation and difference generation.

15. The method of claim 14 wherein said input beam comprises an input frequency $\omega_{in}$ and said generated beam is produced by sum generation with said local oscillator frequency $\omega_{12}$, such that said generated frequency $\omega_g$ is equal to said input frequency $\omega_{in}$ plus said local oscillator frequency $\omega_{12}$.

16. The method of claim 14 wherein said input beam comprises an input frequency $\omega_{in}$ and said generated beam is produced by difference generation with said local oscillator frequency $\omega_{12}$, such that said generated frequency $\omega_g$ is equal to said local oscillator frequency $\omega_{12}$ minus said input frequency $\omega_{in}$.

17. The method of claim 14 wherein said input beam comprises a number N of input frequencies $\omega_{in1} \ldots \omega_{inN}$, where N is an integer.

18. The method of claim 14 wherein said nonlinear generation efficiently takes place inside said nonlinear optical medium in one coherence length $L_c$ between a generating polarization, said generating polarization being created by said first pump beam P1 said second pump beam P2 and said input beam, and said generated beam, thereby reducing the need for phase matching.

19. The method of claim 1 wherein said nonlinear optical medium is a gas.

20. The method of claim 1 wherein said strongly-driven coherent superposition state is adiabatically initiated from said ground state |1> by adding a two-photon detuning from said two-photon transition between said ground state |1> and said second state |2>.

21. The method of claim 20 wherein said two-photon detuning is followed by chirping.

22. The method of claim 1 wherein a two-photon detuning from said first transition and from said second transition is used to maximize said generated beam.

23. A method of nonlinear frequency generation using a nonlinear optical medium comprising elementary entities having a ground state |1> and a second state |2> such that the transition between said ground state |1> and said second state |2> is a dipole forbidden transition, said nonlinear optical medium further having an upper state |3> selected from the energy states |i> above said ground state |1> such that a two-photon transition between said ground state |1> and said second state |2> via said upper state |3> is allowed, said method comprising the following steps:

a) applying to said nonlinear optical medium a first pump beam P1 at a coupling frequency $\omega_c$ corresponding to a first transition between said second state |2> and said upper state |3>;

b) applying a second pump beam P2 at a probe frequency $\omega_p$ corresponding to a second transition between said ground state |1> and said upper state |3>;

c) adjusting the intensities of said first pump beam P1 and of said second pump beam P2 to produce a strongly-driven coherent superposition state of said ground state |1> and said second state |2>; said strongly-driven coherent superposition state creating a local oscillator at a local oscillator frequency $\omega_{12}$; and d) extracting a generated beam from said nonlinear optical medium.

24. The method of claim 23 wherein said upper state |3> is selected such that its energy level is higher than the energy level of said second state |2>, thereby forming a Λ system in said nonlinear optical medium.

25. The method of claim 23 wherein said upper state |3> is selected such that its energy level is lower than the energy level of said second state |2>, thereby forming a ladder system in said nonlinear optical medium.

26. The method of claim 23 wherein said first pump beam P1 is applied before said second pump beam P2 thereby modifying said nonlinear optical medium to render it transparent to said second pump beam P2.

27. The method of claim 26 wherein the intensity of said second pump beam P2 is increased to within one order of magnitude of the intensity of said first pump beam P1, whereby the Rabi frequency $\Omega_c$ of said first pump beam P1 is on the order of magnitude of the Rabi frequency $\Omega_p$ of said second pump beam P2.

28. The method of claim 23 wherein said first pump beam P1 is applied before said second pump beam P2 thereby modifying said nonlinear optical medium to render it refractively thin to said second pump beam P2.

29. The method of claim 28 wherein the intensity of said second pump beam P2 is increased to within one order of magnitude of the intensity of said first pump beam P1, whereby the Rabi frequency $\Omega_c$ of said first pump beam P1 is on the order of magnitude of the Rabi frequency $\Omega_p$ of said second pump beam P2.

30. The method of claim 23 wherein the intensity of said second pump beam P2 is equal to at least one tenth the intensity of said first pump beam P1.

31. The method of claim 23 wherein the number of photons $n_{P1}$ in said first pump beam P1 is selected to exceed the oscillator strength weighted number of said elementary entities $N_E$ in the path of said first pump beam P1 through said nonlinear optical medium such that $(f_{13}/f_{23})(N_E/n_{P1}) \ll 1$, where $f_{13}$ is the strength of transition between said ground state |1> and said upper state |3> and $f_{23}$ is the strength of transition between said second state |2> and said upper state |3>.

32. The method of claim 31 wherein said elementary entities are selected from the group of entities consisting of atoms and molecules.

33. The method of claim 23 wherein the intensity of said first pump beam P1 is such that the a.c. Stark shift in said nonlinear optical medium due to said first pump beam P1 exceeds the inhomogeneous linewidth of said dipole forbidden transition.

34. The method of claim 23 wherein the temporal pulse length of said second pump beam P2 is shorter than the dephasing/homogeneous lifetime of said dipole forbidden transition.

35. The method of claim 23 wherein the temporal pulse length of said second pump beam is on the order of the dephasing/homogeneous lifetime of said dipole forbidden transition.

36. The method of claim 23 wherein said generated beam is produced by parametric oscillation, such that said generated beam comprises a signal frequency $\omega_s$ and an idler frequency $\omega_i$, said signal frequency $\omega_s$ and said idler frequency $\omega_i$ summing to said local oscillator frequency $\omega_{12}$.

37. The method of claim 36 wherein an input beam comprising said signal frequency $\omega_s$ is applied to said nonlinear optical medium, such that both said signal frequency $\omega_s$ and said idler frequency $\omega_i$ in said generated beam are amplified.

38. The method of claim 36 wherein an input beam comprising said idler frequency $\omega_i$ is applied to said nonlinear optical medium, such that both said signal frequency $\omega_s$ and said idler frequency $\omega_i$ in said generated beam are amplified.

39. The method of claim 36 wherein an input beam comprising said signal frequency $\omega_s$ and said idler frequency $\omega_i$ is applied to said nonlinear optical medium, such that both said signal frequency $\omega_s$ and said idler frequency $\omega_i$ in said generated beam are amplified.

40. The method of claim 36 wherein an input beam is applied to said nonlinear optical medium and said nonlinear generation efficiently takes place inside said nonlinear optical medium in one coherence length $L_c$ between a generating polarization, said generating polarization being created by said first pump beam P1 said second pump beam P2 and said input beam, and said generated beam, thereby reducing the need for phase matching.

41. The method of claim 23 wherein said nonlinear optical medium is a gas.

42. The method of claim 23 wherein said strongly-driven coherent superposition state is adiabatically initiated from said ground state |1> by adding a two-photon detuning from said two-photon transition between said ground state |1> and said second state |2>.

43. The method of claim 42 wherein said two-photon detuning is followed by chirping.

44. The method of claim 23 wherein a two-photon detuning from said first transition and from said second transition is used to maximize said generated beam.

45. An apparatus for nonlinear frequency generation using a nonlinear optical medium comprising elementary entities having a ground state |1> and a second state |2> such that the transition between said ground state |1> and said second state |2> is a dipole forbidden transition, said nonlinear optical medium further having an upper state |3> selected from the energy states |i> above said ground state |1> such that a two-photon transition between said ground state |1> and said second state |2> via said upper state |3> is allowed, said apparatus comprising:

a) a first beam source for applying to said nonlinear optical medium a first pump beam P1 at a coupling frequency $\omega_c$ corresponding to a first transition between said second state |2> and said upper state |3>;

b) a second beam source for applying a second pump beam P2 at a probe frequency $\omega_p$ corresponding to a second transition between said ground state |1> and said upper state |3>;

c) a means for adjusting the intensities and the frequencies of said first pump beam P1 and of said second pump beam P2 to produce a strongly-driven coherent superposition state of said ground state |1> and said second state |2>; said strongly-driven coherent superposition state creating a local oscillator at a local oscillator frequency $\omega_{12}$; and d) an input beam source for passing an input beam through said nonlinear optical medium to produce a generated beam having a generated frequency $\omega_g$.

46. The apparatus of claim 45 wherein said nonlinear optical medium is a gas.

47. The apparatus of claim 45 in which the length of said nonlinear optical medium is on the order of the coherence length $L_c$ between a generating polarization, said generating polarization being created by said first pump beam P1 said second pump beam P2 and said input beam, and said generated beam.

48. The apparatus of claim 45 in which said first beam source and said second beam source deliver single-mode beams.

49. The apparatus of claim 45 wherein at a fixed density and at an average propagation constant $\bar{\beta}$ the length of said nonlinear optical medium has a minimum value $L_{NL}=\pi/\bar{\beta}$ set by the minimum number of said elementary entities required for unity conversion efficiency for phase matched condition between a generating polarization, said generating polarization consisting of said first pump beam P1 said second pump beam P2 and said input beam, and said generated beam.

50. An apparatus for nonlinear frequency generation using a nonlinear optical medium comprising elementary entities having a ground state |1> and a second state |2> such that the transition between said ground state |1> and said second state |2> is a dipole forbidden transition, said nonlinear optical medium further having an upper state |3> selected from the energy states |i> above said ground state |1> such that a two-photon transition between said ground state |1> and said second state |2> via said upper state |3> is allowed, said apparatus comprising:

a) a first beam source for applying to said nonlinear optical medium a first pump beam P1 at a coupling frequency $\omega_c$ corresponding to a first transition between said second state |2> and said upper state |3>;

b) a second beam source for applying a second pump beam P2 at a probe frequency $\omega_p$ corresponding to a second transition between said ground state |1> and said upper state |3>;

c) a means for adjusting the intensities and frequencies of said first pump beam P1 and of said second pump beam P2 to produce a strongly-driven coherent superposition state of said ground state |1> and said second state |2>; said strongly-driven coherent superposition state creating a local oscillator at a local oscillator frequency $\omega_{12}$; and d) a means for extracting a generated beam from said nonlinear optical medium.

51. The apparatus of claim 50 wherein said nonlinear optical medium is a gas.

52. The apparatus of claim 50 further comprising an input beam source for applying an input beam to said nonlinear optical medium.

53. The apparatus of claim 52 in which the length of said nonlinear optical medium is on the order of the coherence length $L_c$ between a generating polarization, said generating polarization being created by said first pump beam P1 said second pump beam P2 and said input beam, and said generated beam.

54. The apparatus of claim 52 wherein at a fixed density and at an average propagation constant $\bar{\beta}$ the length of said nonlinear optical medium has a minimum value $L_{NL}=\pi/\bar{\beta}$ set by the minimum number of said elementary entities required for unity conversion efficiency for phase matched condition between a generating polarization, said generating polarization consisting of said first pump beam P1 said second pump beam P2 and said input beam, and said generated beam.

55. The apparatus of claim 50 in which said first beam source and said second beam source deliver single-mode beams.

* * * * *